United States Patent
Yoon et al.

(10) Patent No.: US 12,088,724 B2
(45) Date of Patent: Sep. 10, 2024

(54) METHOD FOR PROVING ORIGINAL OF DATA, AND APPARATUS THEREFOR

(71) Applicant: SAMSUNG SDS CO., LTD., Seoul (KR)

(72) Inventors: Kwan Sik Yoon, Seoul (KR); Eun Kyung Kim, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 225 days.

(21) Appl. No.: 17/562,486

(22) Filed: Dec. 27, 2021

(65) Prior Publication Data

US 2022/0294635 A1   Sep. 15, 2022

(30) Foreign Application Priority Data

Mar. 9, 2021   (KR) .................. 10-2021-0030761

(51) Int. Cl.
| | | |
|---|---|---|
| H04L 9/32 | (2006.01) | |
| G06V 10/25 | (2022.01) | |
| G06V 10/98 | (2022.01) | |
| H04L 9/00 | (2022.01) | |

(52) U.S. Cl.
CPC ............ *H04L 9/3236* (2013.01); *G06V 10/25* (2022.01); *G06V 10/993* (2022.01); *H04L 9/3218* (2013.01); *H04L 9/3247* (2013.01); *H04L 9/50* (2022.05)

(58) Field of Classification Search
CPC ... H04L 9/3236; H04L 9/3218; H04L 9/3247; H04L 9/50; G06V 10/25; G06V 10/993
See application file for complete search history.

(56) References Cited

U.S. PATENT DOCUMENTS

| | | | |
|---|---|---|---|
| 9,128,826 B2 | 9/2015 | Nowoczynski et al. | |
| 11,543,655 B1* | 1/2023 | Weber | G02B 27/0075 |
| 2016/0379330 A1* | 12/2016 | Powers | G06T 1/0028 |
| | | | 382/100 |
| 2018/0232894 A1* | 8/2018 | Kim | G01S 3/00 |
| 2020/0034945 A1* | 1/2020 | Soundararajan | H04L 9/3271 |
| 2020/0076795 A1 | 3/2020 | Kamal | |

(Continued)

FOREIGN PATENT DOCUMENTS

| | | |
|---|---|---|
| CN | 105045536 A | 11/2015 |
| CN | 106897348 A | 6/2017 |

(Continued)

OTHER PUBLICATIONS

Kim et al. "Face liveness detection using variable focusing." 2013 International Conference on Biometrics (ICB). 2013, p. 1-13 ( Year: 2013).*

(Continued)

*Primary Examiner* — Han Yang
*Assistant Examiner* — Zhe Liu
(74) *Attorney, Agent, or Firm* — Sughrue Mion, PLLC

(57) ABSTRACT

A method according to an embodiment of the present disclosure includes obtaining proof data including a photographed image and a challenge code for proving original of the image, generating hash data by using the proof data, generating signature data for the hash data, transmitting the proof data, the hash data, and the signature data to a server, and receiving an access path to an original verification result of the proof data from the server.

11 Claims, 17 Drawing Sheets

(56) References Cited

U.S. PATENT DOCUMENTS

| | | | |
|---|---|---|---|
| 2020/0218886 A1* | 7/2020 | Sheets | H04N 23/80 |
| 2020/0320679 A1 | 10/2020 | McGregor et al. | |
| 2020/0382285 A1 | 12/2020 | Nuzzi | |
| 2021/0195055 A1* | 6/2021 | Sardesai | H04N 1/32283 |
| 2021/0344491 A1* | 11/2021 | Upadhyay | G06V 20/30 |
| 2021/0390556 A1* | 12/2021 | Bermudez | G06Q 20/405 |

FOREIGN PATENT DOCUMENTS

| | | |
|---|---|---|
| CN | 108847945 A | 11/2018 |
| KR | 10-1948721 B1 | 2/2019 |
| KR | 10-1977178 B1 | 5/2019 |
| KR | 10-2020-0018159 A | 2/2020 |
| KR | 10-2160137 B1 | 9/2020 |
| KR | 10-2179497 B1 | 11/2020 |
| WO | 99/31844 A1 | 6/1999 |
| WO | 2018/009568 A1 | 1/2018 |

OTHER PUBLICATIONS

Communication dated Jun. 6, 2023, issued by the Intellectual Property Office of Singapore in counterpart Singaporean Patent Application No. 10202113957Q (Date of actual completion of the search: May 6, 2023; Date of Written Opinion: Jun. 6, 2023).

* cited by examiner

METHOD FOR PROVING ORIGINAL OF DATA, AND APPARATUS THEREFOR

CROSS-REFERENCE TO RELATED APPLICATION AND CLAIM OF PRIORITY

This application claims the benefit of Korean Patent Application No. 10-2021-0030761, filed on Mar. 9, 2021, in the Korean Intellectual Property Office, the disclosure of which is incorporated herein by reference in its entirety.

BACKGROUND

1. Field

The present invention relates to a method for proving the original and an apparatus therefor. More particularly, it relates to a method for proving whether data including an image is the original or processed data, and an apparatus therefor.

2. Description of the Related Art

With the development of digital image processing technology and image printing technology, the demand for verifying whether the multimedia data such as images or certificate files is the original is increasing. This is because it is not easy to determine the authenticity of multimedia data processed by sophisticated technology with the human eye.

Conventional multimedia data forgery/falsification detection technology uses a watermark or digital signature with an already generated multimedia output file to detect forgery/falsification of the original, or analyze the characteristics of the file itself to check whether it is original. However, since these conventional forgery/falsification detection technologies are not connected to the terminal, there is a possibility that the data file may be manipulated, such as by synthesizing, partially deleting, or adding data in advance, and even if there is no problem in the data file itself, there is a problem in that it is difficult to accurately determine whether it is the original since a subject contained in the data file may be processed. For example, if a computer-processed image is generated and then printed, and a data file is generated by photographing the output image, no manipulation is applied to the data file itself, but since the subject is a processed one, the contents may not be the original.

Therefore, there is a need for a new type of original proving technology that can more accurately verify the possibility of forgery/falsification of data and determine whether an image contained in data is a real subject or a processed subject.

SUMMARY

A technical problem to be solved through some embodiments of the present invention is to provide an original proving method capable of accurately verifying whether multimedia data is the original or processed one, and an apparatus therefor.

Another technical problem to be solved through some embodiments of the present invention is to provide an original proving method capable of verifying whether the subject of the image is a real subject or a processed subject in connection with a user terminal from the step of generating multimedia data, and an apparatus therefor.

Another technical problem to be solved through some embodiments of the present invention is to provide an original proving method capable of blocking the possibility of manipulating the generated multimedia data and closely verifying whether it is the original, and an apparatus therefor.

The technical problems of the present invention are not limited to the technical problems mentioned above, and other technical problems not mentioned will be clearly understood by those skilled in the art from the following description.

According to an aspect of the inventive concept, there is provided a method performed by a computing device for proving original. The method comprises obtaining proof data including a photographed image and a challenge code for proving original of the image, generating hash data by using the proof data, generating signature data for the hash data. transmitting the proof data, the hash data, and the signature data to a server, and receiving an access path to an original verification result of the proof data from the server.

The original verification result may be generated according to a result of the server verifying the hash data, the signature data, and the challenge code.

The transmitting may comprise generating a transaction for recording the hash data in a blockchain network.

The transmitting may further comprise obtaining a transaction ID (identification) of the transaction, and transmitting the transaction ID to the server.

The server may compare the transmitted hash data with hash data recorded in the blockchain network to verify the hash data.

The method may further comprise photographing a subject by a photographing method based on a real subject discrimination algorithm to generate the image.

The generating the image may comprise obtaining a screen division value for photographing the image, dividing a photographing screen into a plurality of sections based on the screen division value, photographing a first image by focusing a first section among the plurality of sections, photographing a second image by focusing a second section among the plurality of sections, and storing the first image and the second image as the image.

The method may further comprise providing the received access path to an external device.

The external device may include an insurance company server, a trading brokerage site server, a law firm server, a media company server, or a public institution server, and uses the access path to check the original verification result of the proof data.

According to an aspect of the inventive concept, there is provided a method performed by a computing device for proving original. The method comprises receiving proof data, hash data generated using the proof data, and signature data for the hash data from a user terminal, wherein the proof data includes a photographed image and a challenge code for proving original of the image, verifying the hash data, the signature data, and the challenge code, generating an original verification result of the proof data based on the verification result, and transmitting an access path to the original verification result to the user terminal.

The verifying may comprise verifying the hash data by comparing the hash data with hash data recorded in a blockchain network.

The verifying may comprise determining whether the image is an image of photographing a real subject.

The image may include a first image and a second image, wherein the first image and the second image are images of photographing the same subject, wherein the determining comprises obtaining a screen division value related to the image, checking focused sections of the first image and the second image with reference to the screen division value, and determining whether the image is an image of photographing a real subject based on a result of checking the focused sections.

The method may further comprise providing the original verification result of the proof data to an external device in response to a request of the external device through the access path, wherein the external device includes an insurance company server, a trading brokerage site server, a law firm server, a media company server, or a public institution server.

According to an aspect of the inventive concept, there is provided a user terminal. The user terminal comprise a proof data generation module for generating proof data including a photographed image and a challenge code for proving original of the image, a hash extraction module for generating hash data by using the proof data, a signature module for generating signature data for the hash data, a communication module for transmitting the proof data, the hash data, and the signature data to a server, and an access path management module for managing an access path to an original verification result of the proof data transmitted from the server.

According to an aspect of the inventive concept, there is provided an original verification server. The original verification server comprise a communication module for receiving proof data, hash data generated using the proof data, and signature data for the hash data from a user terminal, wherein the proof data includes a photographed image and a challenge code for proving original of the image, a hash verification module for verifying the hash data, a signature verification module for verifying the signature data, a challenge code management module for verifying the challenge code, a verification result generation module for generating an original verification result of the proof data based on a result of verifying the hash data, the signature data, and the challenge code, and an access path management module for providing an access path to the original verification result to the user terminal.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
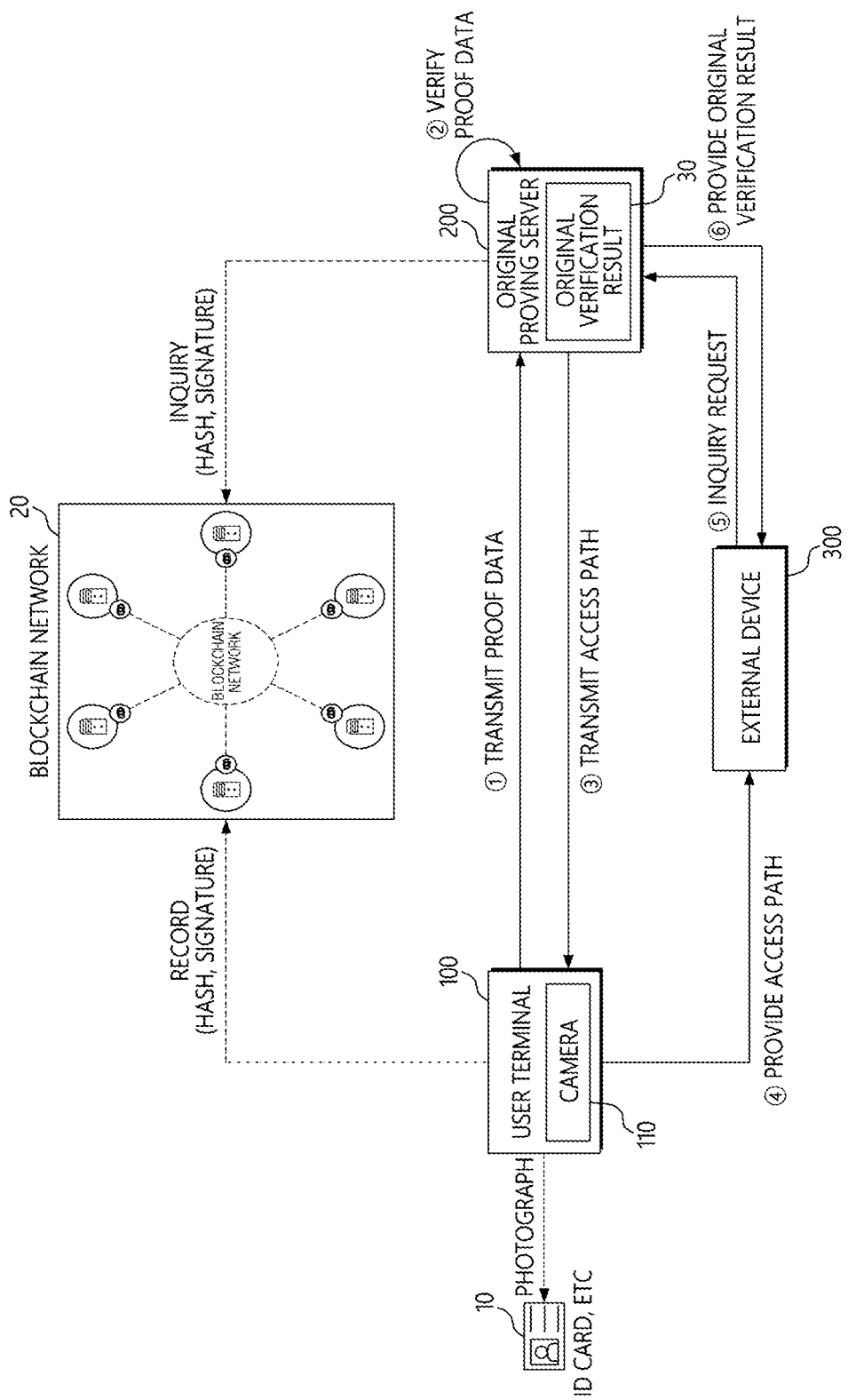
FIG. 1 is a diagram for describing an original proving method at a system level according to an embodiment of the present invention.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a diagram for describing an original proving method at a system level, according to an embodiment of the present invention. Referring to FIG. 1, the original proving system may include a user terminal 100, an original proving server 200, an external device 300, and/or a blockchain network 20. FIG. 1 shows a schematic system flow of an original proving method according to the present invention.

The user terminal 100 generates proof data and transmits the proof data to the original proving server 200 to prove the original of the proof data. In this case, the proof data may be multimedia data, such as an image obtained by photographing the subject 10 using the camera 110 built in the user terminal 100.

The original proving server 200 verifies whether the proof data transmitted by the user terminal 100 is the original. Then, the original proving server 200 generates the original verification result 30 according to the previously verified result, and transmits an access path to the original verification result 30 to the user terminal 110. After storing the transmitted access path, the user terminal 100 provides the access path to the external device 300.

The external device 300 is a server of a target institution, for which the user of the user terminal 100 wants to prove the original of the proof data, and may be, for example, an insurance company server, a trading brokerage site server, a law firm server, a media company server, or a public institution server. For example, when the proof data is a document for claiming insurance money, the external device 300 becomes an insurance company server, and when the proof data is a report data for reporting a press article, the external device 300 becomes a media company server. The external device 300 requests the original proving server 200 to inquire about the original verification result 30 through the access path provided by the user terminal 100.

After confirming whether the inquiry request is a normal request through the correct access path, the original proving server 200 provides the original verification result 30 to the external device 300 if it is a normal request. The external device 300 checks whether the proof data submitted by the user terminal 100 is the original by inquiring the provided original verification result 30.

On the other hand, in the present invention, in order to prove that the proof data is the original that has not been forged/falsified, various original verification techniques are proposed as follows.

First, a real subject discrimination algorithm for discriminating whether a subject 10 photographed with a camera is a real subject or a processed subject is applied in the proof data generation step and the verification step. The user terminal 100 generates proof data by photographing the subject 10 according to the real subject discrimination algorithm, and the original proving server 200 analyzes the proof data according to the real subject discrimination algorithm to determine whether the image in the proof data is a real subject image or a processed subject image The real subject algorithm proposed by the present invention, and the image photographing method and reading method according thereto will be described in detail below with reference to FIG. 8, and thus a description thereof will be omitted herein.

Next, the original verification technique using the challenge code and/or server time is applied. Specifically, the user terminal 100 communicates with the original proving server 200 when generating the proof data, receives the challenge code and the server time from the original proving server 200, and generates proof data by packaging them together with an image, etc. The challenge code is provided with a different value each time the user terminal 100 generates proof data, and as a server time, a timestamp value based on the server-side time when the user terminal 100 communicates with the original proving server 200 for generating proof data is provided. The original proving server 200 verifies the real-time authenticity and forgery/falsification of the proof data by checking whether the challenge code and server time in the proof data match the challenge code and server time previously provided by itself. For example, if the challenge code or server time in the proof data is different from that previously provided by the original proving server 200, the proof data is not generated when the user terminal 100 communicates with the original proving server 200, or is considered to be forged/falsified after generation, and its real-time authenticity and proof of original may be denied.

In addition, encryption technology and original verification technology using external storage are applied. Specifically, after generating the proof data, the user terminal 100 extracts the hash data for the proof data by using a hash function, and performs a signature on the extracted hash data again using an encryption key to generate the signature data. Then, the user terminal 100 records the hash data and the signature data in the blockchain network 20, which is an external storage, and then transmits the hash data and the signature data together when transmitting the proof data to the original proving server 200. The original proving server 200 inquiries the blockchain network 20 to determine whether the hash data and signature data transmitted from the user terminal 1000 are valid based on the hash data and signature data recorded in the blockchain network 20. If the transmitted signature data is not valid, the hash data, signature data and/or proof data are considered to be forged/falsified after generation, and the proof of original is denied, which can detect data manipulation after generation of the proof data. As an embodiment, the signature data recorded in the blockchain network 20 may include information for verification of the transmitted signature data.

According to the embodiments of the present invention described above, it is possible to verify whether the photographed subject is a real subject by applying the original verification technology linked with the user terminal from the multimedia data generation step, and it is possible to block the possibility of file manipulation of multimedia data through the use of a challenge code and the linkage of the blockchain network to more closely verify whether the multimedia data is the original or not.

Figure 2:
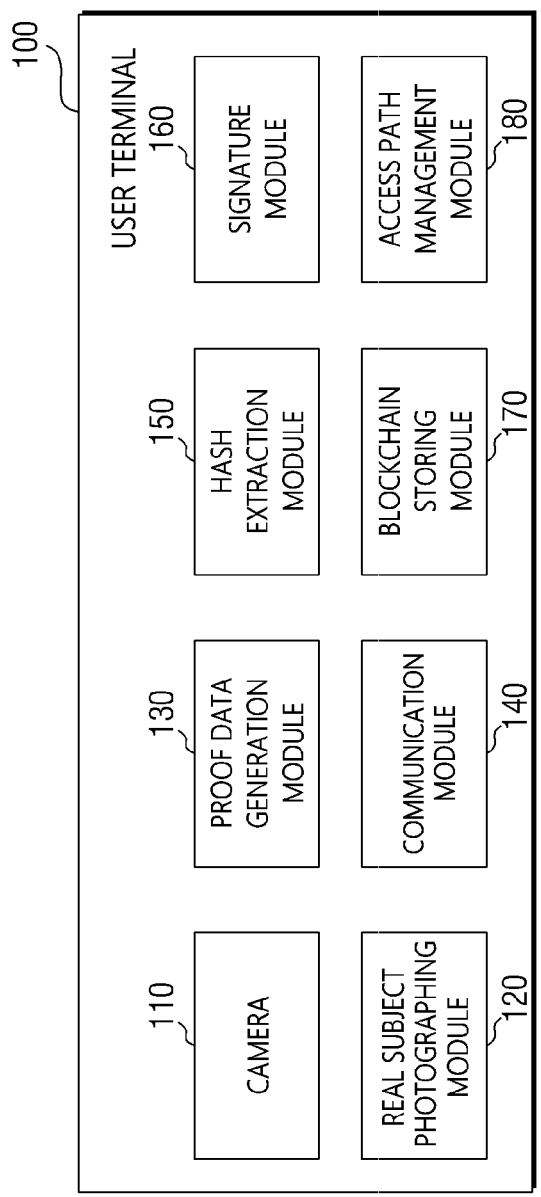
FIG. 2 is a diagram illustrating a detailed configuration of the user terminal shown in FIG. 1.

In FIG. 2 and the following, more specific embodiments of the original proving method and system described in FIG. 1, and the user terminal 100 and the original proving server 200 for the same will be described with drawings.

FIG. 2 is a diagram illustrating a detailed configuration of the user terminal shown in FIG. 1. Referring to FIG. 2, the user terminal 100 may include a camera 110, a real subject photographing module 120, a proof data generation module 130, a communication module 140, a hash extraction module 150, a signature module 160, a blockchain storing module 170, and/or an access path management module 180.

The camera 110 is a component that generates a subject image to be provided as proof data by photographing the subject. In FIG. 2, the camera 110 built into the user terminal 100 is illustrated, but the present invention is not limited thereto. It is also possible that the camera 110 is an external camera and transmits an image photographed through the camera 110 through a wired/wireless network to the user terminal 100. Since the specific configuration and function of the camera 110 are widely known in the art, a description thereof will be omitted here.

The real subject photographing module 120 is a module, in which a real subject discrimination algorithm for discriminating whether it is a real subject or a processed subject is implemented, and is a module that controls the camera 110 to perform photographing according to the real subject discrimination algorithm when photographing a subject. The real subject discrimination algorithm and the image photographing method based thereon will be described in detail as a separate item with reference to FIG. 8 and the following, and thus, related descriptions will be omitted here to avoid duplication of description.

The proof data generation module 130 is a module for generating proof data to receive an original proof. In this case, the proof data may be multimedia data including an image photographed through the camera 110, but is not limited thereto. The proof data generation module 130 may receive a challenge code and server time from the original proving server when generating proof data, and package the received challenge code and server time with an image or other data to generate proof data. In this case, the challenge code and the server time may be inserted as metadata of the image or other data, or may be inserted as separate data separated therefrom.

As an embodiment, the challenge code may be inserted into the proof data as it is received from the original proving server, or the converted data may be inserted into the proof data after being converted into other types of data through a hash function or the like.

The communication module 130 is a module for performing data communication between the user terminal 100 and the original proving server. For example, when interworking between the user terminal 100 and the original proving server is required for the operation of the real subject photographing module 120, when the user terminal 100 receives the challenge code and the server time from the original proving server, when the user terminal 100 transmits proof data, hash data, and/or signature data, etc. to the original proving server, and when the user terminal 100 receives an access path to the original verification result from the original proving server, data communication between the user terminal 100 and the original proving server may be performed through the communication module 130.

The hash extraction module 150 is a module for calculating a hash value for proof data using a hash function. The hash function may be a hash function based on a hash algorithm such as SHA-256 or SHA-512, but the scope of the present invention is not limited thereto. As an embodiment, the hash extraction module 150 may extract hash data from the entire proof data, but may also extract hash data from only a part of the proof data. For example, the hash extraction module 150 may extract hash data by using only the image file in the proof data and its metadata as input values of the hash function.

The signature module 160 is a module that performs a digital signature using a signature key on the hash data extracted by the hash extraction module 150. The signature module 160 generates signature data as a result of the signature. As a digital signature, a signature method based on an asymmetric key encryption method using a pair of signature keys and verification key is widely used, but the scope of the present invention is not limited thereto. Specific methods and algorithms for digital signatures are well known in the art, and a description thereof will be omitted herein.

The blockchain storing module 170 is a module for recording hash data and signature data generated by the hash extraction module 150 and the signature module 160 in an external blockchain network. The blockchain storing module 170 generates a transaction for recording hash data and signature data in the blockchain network, and then obtains a transaction ID (transaction identification) for the transaction. In this case, the blockchain network may be a public network such as an Ethereum network, or a private network such as a Hyper Ledger network. The configuration of a blockchain network and a method of generating a transaction for recording data in the blockchain network are well known in the art, and thus a description thereof will be omitted here.

The access path management module 180 is a module for storing and managing an access path to the original verification result transmitted by the original proving server. The access path management module 180 may provide the stored access path to an external device, to which the original proof will be submitted, according to a user's request. As an embodiment, the access path may be a URL link for accessing the original verification result, but the scope of the present invention is not limited thereto. For example, the access path may be a password or other authentication means required to inquire the original verification result stored in the original proving server.

Figure 3:
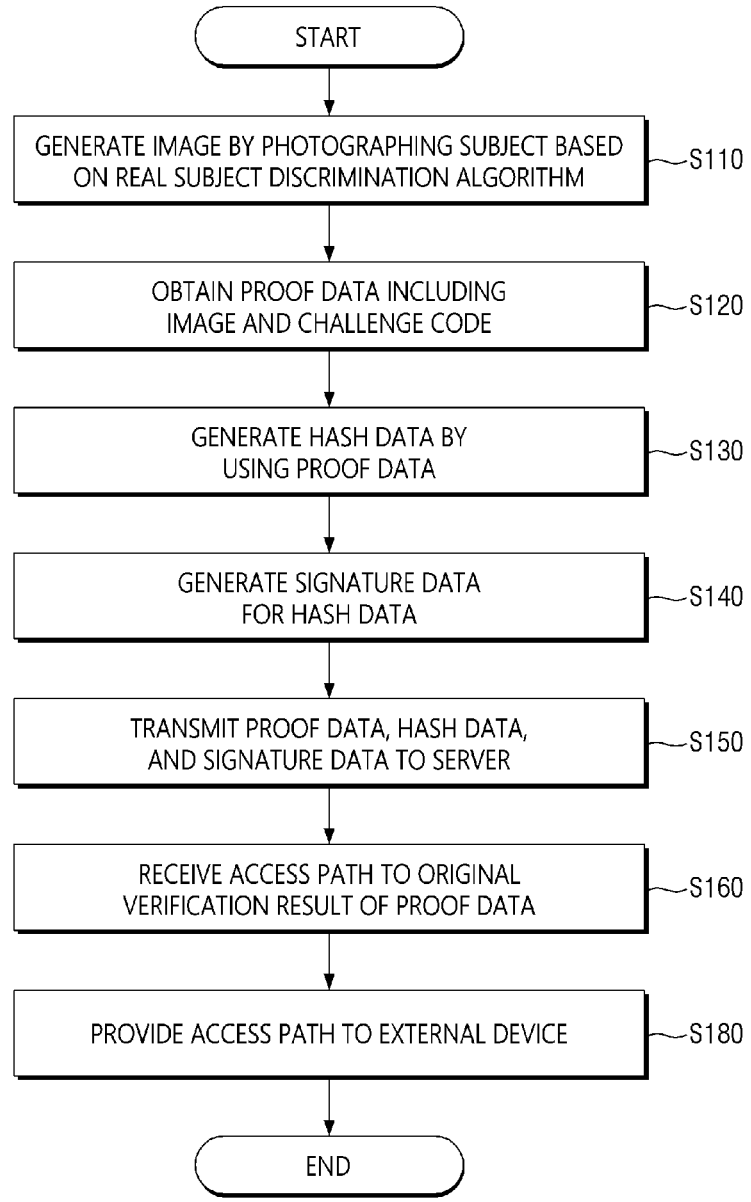
FIG. 3 is a flowchart for describing a specific operation method of the user terminal shown in FIG. 2.

Next, in FIG. 3, a detailed operation method of the user terminal will be described based on the components described in FIG. 2. The method described in FIG. 3 is performed by the user terminal of FIG. 1, and when the subject of each step is omitted, it is assumed that the subject is the user terminal. In the description of each step, the content overlapping with the previously described content will be omitted for the sake of brevity of the description.

In step S110, an image is generated by photographing a subject based on a real subject discrimination algorithm.

In step S120, proof data for requesting proof of original to the original proving server is generated. In this case, the proof data may include the challenge code and server time transmitted by the original proving server together with the previously generated image.

In step S130, hash data for the generated proof data is generated.

In step S140, signature data for the generated hash data is generated.

In step S150, the generated proof data, hash data, and signature data are transmitted to the original proving server. The original proving server verifies whether the proof data is the original using the transmitted hash data and signature data, and generates an original verification result of the proof data based on the verified result.

In step S160, an access path to the original verification result of the proof data is received from the original proving server.

In step S170, an access path is provided to the external device to submit the original proof for the proof data. In this case, the external device may be an insurance company server, a trading brokerage site server, a law firm server, a media company server, or a public institution server.

Figure 4:
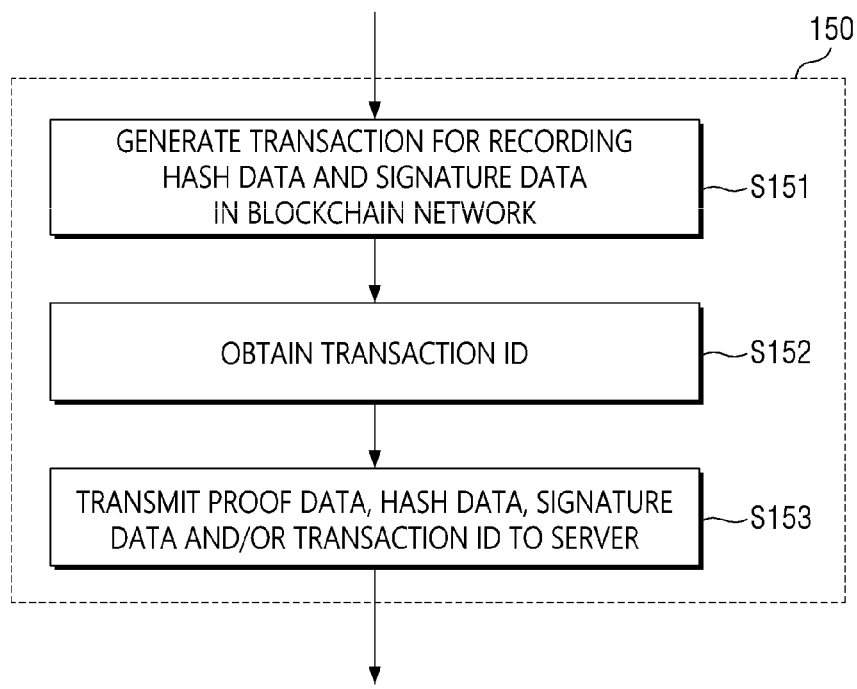
FIG. 4 is a flowchart illustrating an embodiment, in which step S150 of FIG. 3 is further detailed.

FIG. 4 is a flowchart illustrating an embodiment, in which step S150 of FIG. 3 is further detailed. In FIG. 4, an embodiment, in which the step of recording the generated hash data and signature data in an external blockchain network and obtaining the transaction ID is added, is described. Hereinafter, it will be described with reference to the drawings.

In step S151, a transaction for recording hash data and signature data in the blockchain network is generated.

In step S152, after the transaction is successfully performed, a transaction ID of the corresponding transaction is obtained.

In step S153, the obtained transaction ID together with the previously generated proof data, hash data, and/or signature data are transmitted to the original proving server.

Figure 5:
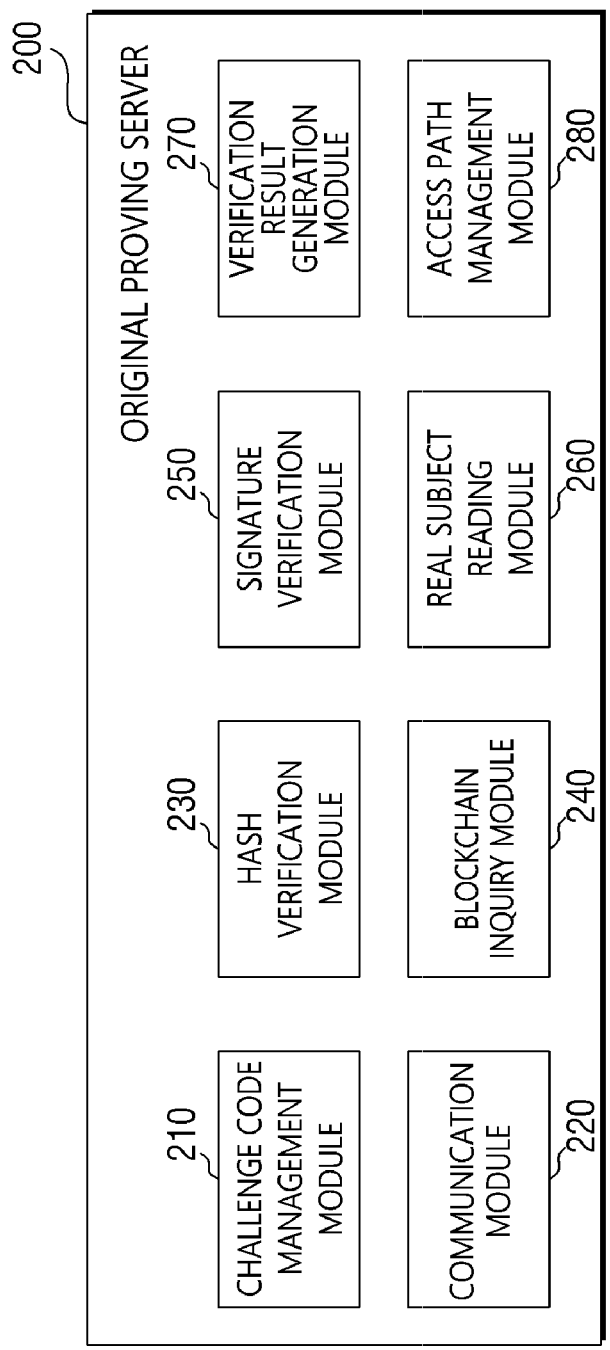
FIG. 5 is a diagram showing a detailed configuration of the original proving server shown in FIG. 1.

FIG. 5 is a diagram showing a detailed configuration of the original proving server shown in FIG. 1. Referring to FIG. 5, the original proving server 200 may include a challenge code management module 210, a communication module 220, a hash verification module 230, a blockchain inquiry module 240, a signature verification module 250, and a real subject reading module 260, a verification result generation module 270, and/or an access path management module 280.

The challenge code management module 210 is a module that generates and provides a challenge code in connection with the user terminal when the user terminal photographs a subject or proof data is generated. In this case, the challenge code management module 210 may further obtain the server time together with the challenge code and provide it to the user terminal. In addition, the challenge code management module 210 may further perform a challenge code verification operation that checks whether the challenge code and server time included in the proof data received from the user terminal match those provided by the challenge code management module 210 to determine whether or not real-time authenticity and forgery/falsification of the proof data.

The communication module 220 is a module for performing data communication between the original proving server 200 and the user terminal. For example, when interworking between the user terminal and the original proving server 200 is required for the operation of the real subject photographing module 120, when the original proving server 200 transmits a challenge code and server time to the user terminal, when the original proving server 200 receives proof data, hash data, and/or signature data from the user terminal, and when the original proving server 200 transmits an access path to the original verification result to the user terminal, data communication between the original proving server 200 and the user terminal may be performed through the communication module 220.

The hash verification module 230 is a module that verifies the hash data received from the user terminal. Verification of hash data can be performed in various ways, but in this embodiment, a method using a blockchain network is exemplified. Specifically, the hash verification module 230 accesses the blockchain network, inquires the hash data previously recorded by the user terminal in the blockchain network, and compares it with the hash data received from the user terminal to check whether the same or not so that the hash data can be verified. In this case, if both are the same, it is determined that the hash data received from the user terminal is correct, and if they are different, it is determined that the hash data received from the user terminal is incorrect.

The signature verification module 240 is a module for verifying the signature data received from the user terminal. The verification of the signature data may be performed in various ways, but in this embodiment, a method of verifying the signature data through two-step verification is exemplified. Specifically, the signature verification module 250 accesses the blockchain network, inquires the signature data previously recorded by the user terminal in the blockchain network, and compares it with the signature data received from the user terminal to check whether it is valid so that the signature data can be first verified. In this case, if they are the same, it is determined that the signature data received from the user terminal is correct, and if they are different, it is determined that the signature data received from the user terminal is incorrect.

And, when the first verification is completed, the second verification of the signature data is performed. The second verification is a step of confirming that the signature data is not abnormal through the signature verification algorithm. In the second verification, after inputting the hash data, signature data, and verification key received from the user terminal into the signature verification algorithm, it is determined whether the signature data is abnormal through the result thereof. In this case, the verification key refers to an encryption key paired with the signature key used to generate the signature data in advance. Specific details of a signature verification algorithm and a signature verification method based thereon are widely known in the art, and thus a description thereof will be omitted herein.

The blockchain inquiry module 250 is a module that accesses an external blockchain network and inquires information necessary for original proof of proof data. For example, the blockchain inquiry module 240 may access the blockchain network for verification of hash data and signature data received from the user terminal, and read the hash data and signature data previously recorded by the user terminal. As an embodiment, the blockchain inquiry module 240 may refer to the transaction ID provided by the user terminal, and check the location where hash data and signature data are recorded on the blockchain network. Detailed information on how to access the blockchain network to inquire and check the recorded information is widely known in the art, so a description thereof will be omitted here.

The real subject reading module 260 is a module, in which a real subject discrimination algorithm is implemented, and determine whether an image included in the proof data is an image of photographing a real subject or an image of photographing a processed subject. As in FIG. 2, the real subject discrimination algorithm and the image determination method based thereon will be specifically described as separate items in FIG. 8 and the following, and thus, related descriptions will be omitted here to avoid duplication of description.

The verification result generation module 270 generates an original verification result for the proof data based on the challenge code and server time verification, the hash data verification, the signature data verification, and/or the real subject determination result by the challenge code management module 210, the hash verification module 230, the signature verification module 240, and/or the real subject reading module 260. At this time, if the challenge code and server time verification, the hash data verification, the signature data verification, and/or the real subject determination results are all pass, an original verification result indicating that the proof data is the original data may be generated, and if any one of the challenge code and server time verification, the hash data verification, the signature data verification, and/or the real subject determination result is fail, an original verification result indicating that the proof data is not the original data may be generated.

The access path management module 280 generates an access path to the original verification result, and provides the generated access path to the user terminal. In addition, the access path management module 280 determines whether to approve the inquiry request by checking whether the inquiry request is appropriate in response to the original verification result inquiry request from the external device. For example, when an inquiry request of an external device is received through the normal access path provided by the access path management module 280 to the user terminal, the access path management module 280 considers that the inquiry request is appropriate and provides the original verification result to the external device. On the other hand, if the access path, through which the inquiry request of the external device is received, is not provided by the access path management module 280 or is identified as an abnormal access path for other reasons, the access path management module 280 considers that the inquiry request is not appropriate and rejects the inquiry request.

Figure 6:
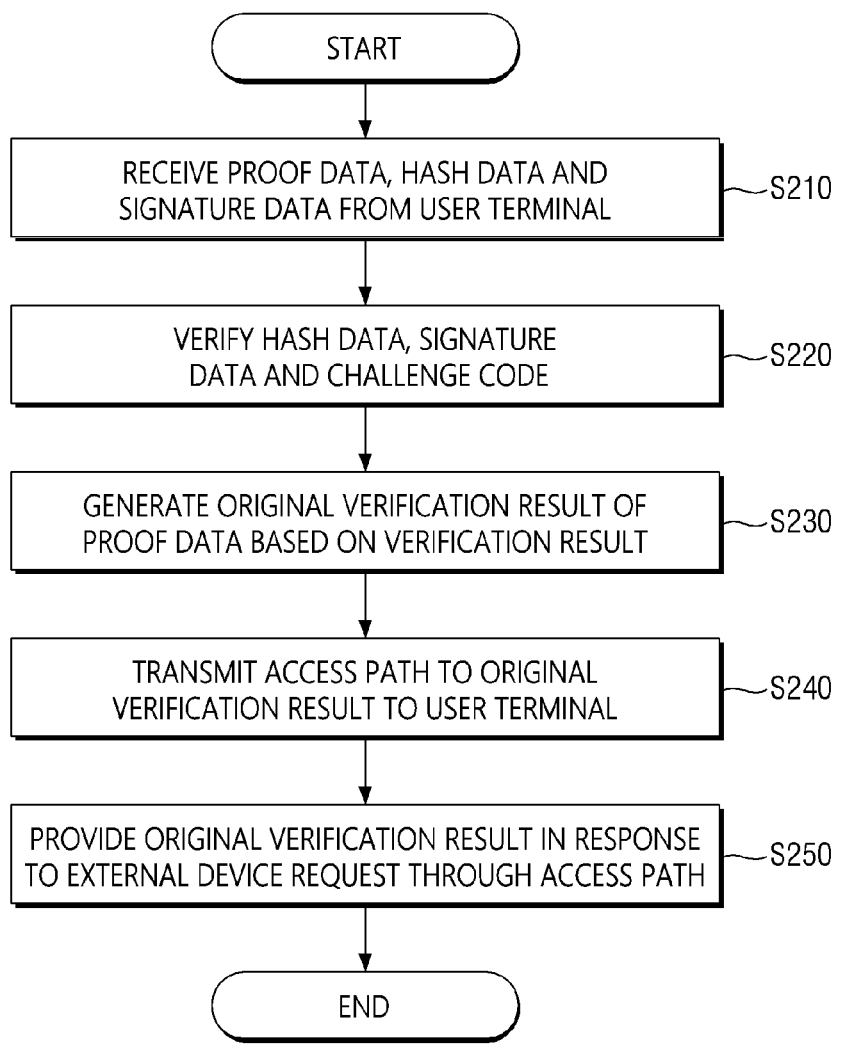
FIG. 6 is a flowchart for describing a specific operation method of the original proving server shown in FIG. 5.

Next, in FIG. 6, a detailed operation method of the original proving server will be described based on the components described in FIG. 5. The method described in FIG. 6 is performed by the original proving server of FIG. 1, and if the subject of each step is omitted, it is assumed that the subject is the original proving server. In the description of each step, the content overlapping with the previously described content will be omitted for the sake of brevity of the description.

In step S210, proof data, hash data, and signature data are received from the user terminal. In this case, the proof data may include a photographed image, and a challenge code and a server time for proving the original of the image.

In step S220, the hash data, signature data and challenge code are verified.

In step S230, an original verification result of the proof data is generated based on the verification result.

In step S240, an access path for the generated original verification result is generated, and the access path is transmitted to the user terminal.

In step S250, when an inquiry request for the original verification result is received from the external device through the access path, it is determined whether the corresponding access path is normal, and the original verification result is provided to the external device accordingly.

Figure 7:
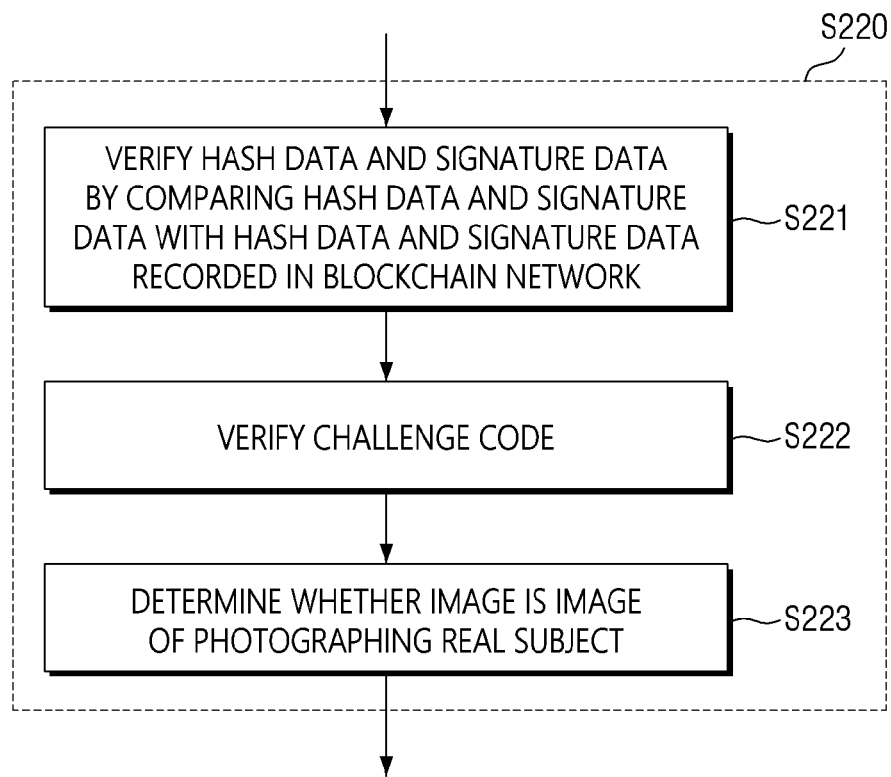
FIG. 7 is a flowchart illustrating an embodiment, in which step S220 of FIG. 6 is further detailed.

FIG. 7 is a flowchart illustrating an embodiment, in which step S220 of FIG. 6 is further detailed. In FIG. 7, an embodiment, in which a step of verifying whether an image included in the proof data is an image of photographing a real subject is added, is described. Hereinafter, it will be described with reference to the drawings.

In step S221, the hash data and/or signature data received from the user terminal are compared with hash data and/or signature data recorded in the blockchain network, and the hash data and/or signature data received from the user terminal are verified.

In step S222, it is checked whether the challenge code and/or server time included in the proof data is the same as the challenge code and/or server time previously provided by the original proving server, so that the challenge code and/or server time included in the proof data is verified.

In step S223, based on the real subject discrimination algorithm, it is determined whether the image included in the proof data is an image of photographing a real subject.

Meanwhile, in FIG. 7, verification of hash data and signature data, verification of challenge code and server time, and determination of whether an image is a real subject are sequentially performed, but the scope of the present invention is not limited thereto. The order of the verification and determination may be reversed, and each may be performed simultaneously and in parallel.

Figure 8:
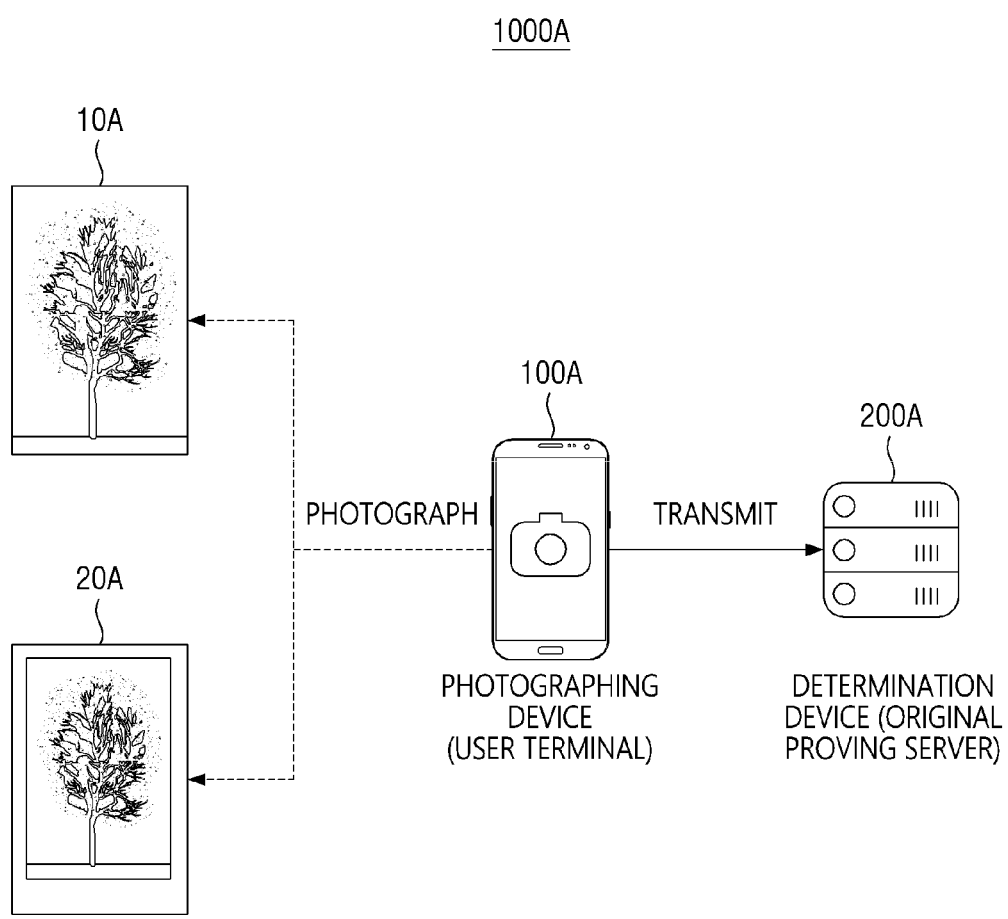
FIG. 8 is a diagram for conceptually describing a method for photographing and determining an image based on the real subject discrimination algorithm of the present invention.

In FIG. 8 and the following, a detailed description of the real subject discrimination algorithm referenced in the above description is provided. Hereinafter, the related description will be continued with reference to the drawings.

Image Photographing Method and Determination Method Based on Real Subject Discrimination Algorithm In this section, an algorithm for determining whether a photographed image is an image of photographing a real subject or a re-photographed image using an existing photographed image as a subject, an image photographing method based on the algorithm, and an image determination method are described.

FIG. 8 is a diagram for conceptually describing an image photographing method and a determination method based on the real subject discrimination algorithm of the present invention.

In the system environment 1000A illustrated in FIG. 8, the photographing device 100A (e.g., a user terminal) photographs the subjects 10A and 20A using a built-in camera. The subjects 10A and 20A to be photographed may be a real subject 10A, which is actually present, or may be a picture or a video screen 20A that has been previously photographed. Hereinafter, a real subject, which is an actually present object, will be referred to as a 3-dimensional subject, and a subject, which is a previously photographed photo or video screen, will be referred to as a 2-dimensional subject.

In this case, the photographing device 100A photographs a plurality of images with different focus points for the same subject in order to determine whether the photographed image is a 3-dimensional subject image or a 2-dimensional subject image. A plurality of images photographed in this way will be referred to as a multi-focus image. A detailed description of the multi-focus image and its photographing method will be described later in detail with reference to FIG. 9 and the following, and thus a detailed description thereof will be omitted herein.

Then, after storing the multi-focus image, the photographing device 100A transmits the multi-focus image to the determination device 200A at a synchronization point with the determination device 200A (e.g., an original proving server).

The determination device 200A analyzes the transmitted multi-focus image, and determines whether the image is a 3-dimensional subject image or a 2-dimensional subject image. For example, if the previously photographed subject is the 3-dimensional subject 10A, an image, in which different portions are focused whenever the focus point is changed, will be photographed. For example, when the focus point is the background, an image with a clear background but a blurred tree will be photographed, and if the focus point is a tree, an image with a clear tree but a blurred background will be photographed. On the other hand, if the previously photographed subject is a 2-dimensional subject 20A, an image with no significant difference in the focused portion will be photographed even when the focus point is changed. That is, in the case of the 2-dimensional subject 20A, regardless of whether the focus point is a background or a tree, the distance (or depth) from the photographing device 100A is the same, so that an image, in which both the background and the tree have the same sharpness (i.e., similar to a previously photographed photo or video screen), will be photographed.

According to this principle, the determination device 200A analyzes the multi-focus image, and if the focused portions thereof are different from each other, the determination device 200A determines the image as a 3-dimensional subject image obtained by photographing the real subject 10. Conversely, the determination device 200A analyzes the multi-focus image, and if the focused portions thereof are identical or similar to each other, the determination device 200A determines the image as a 2-dimensional subject image.

As an embodiment, in this case, the determination device 200A may determine the type of the multi-focus image by further referring to a focused area or a focused order of the focused portions. This will be described in detail below with reference to FIG. 9.

According to the above-described method of the present invention, it is possible to easily determine whether a pre-photographed photo or video screen is re-photographed and manipulated, forged or falsified as if it was actually photographed, and the processed image is submitted. If the focused portions of the multi-focus image are identical to or similar to each other, it can be seen that a 2-dimensional subject is photographed, and thus it can be known that a real subject is not photographed.

Figure 9:
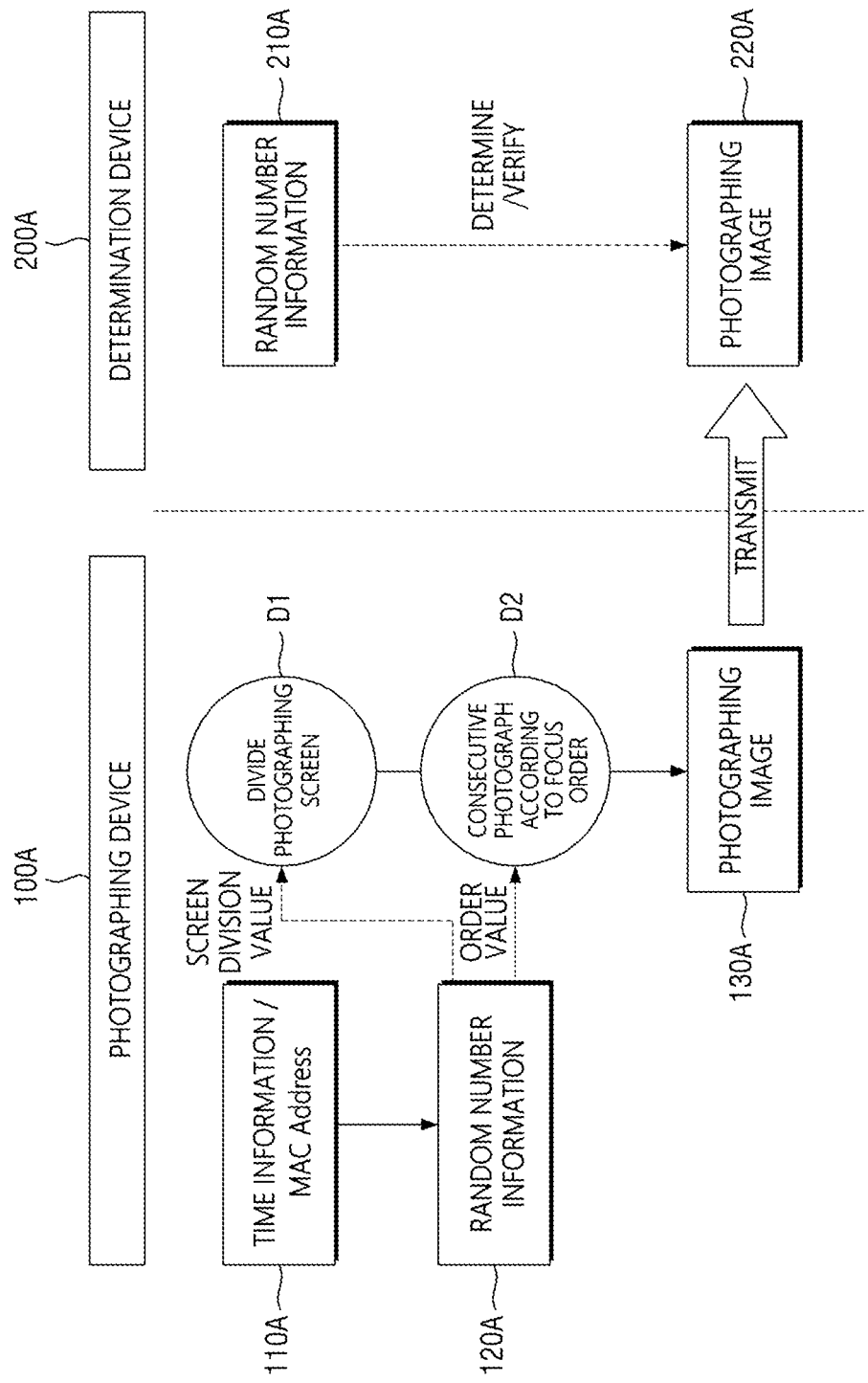
FIG. 9 is a block diagram illustrating a specific method of photographing a multi-focus image through the photographing apparatus and the determination apparatus shown in FIG. 8 and determining whether the image is a real image based thereon.

FIG. 9 is a block diagram illustrating a detailed method of photographing a multi-focus image and determining whether or not a real subject image based thereon through the photographing device 100A and the determination device 200A shown in FIG. 8. In the embodiment of FIG. 8, a method of dividing a screen to divide areas to be multi-focused, and photographing and determining a multi-focus image in consideration of a focus order for the divided areas is described. Hereinafter, it will be described with reference to the drawings.

First, the photographing device 100A generates random number information 120A according to a predetermined rule. As an embodiment, the random number information 120A may be generated based on time information and the MAC address 110A of the photographing device 100A.

The photographing device 100A generates the random number information 120A using a predetermined random number generation algorithm in order to share the random number information 120A with the determination device 200A. In this case, the random number generation algorithm may be an algorithm that receives the time information when generating the random number information 120A and the MAC address of the photographing device 100A generating the random number information 120A as an input factor 120A so that different random number information is generated according to a time for photographing a multi-focus image and a photographing device. There are various types of random number generation algorithms for generating random numbers based on a specific input factor, and their technical contents are also widely known in the art, so a detailed description thereof will be omitted here.

The generated random number information 120A may include a screen division value referenced for dividing a photographing screen when multi-focus photographing is performed, and an order value designating a focus order of each divided screen area.

The photographing device 100A divides the photographing screen into a plurality of areas according to the screen division value among the random number information 120A (D1). For example, if the screen division value is 3, the photographing device 100A divides the photographing screen into three areas. Similarly, if the screen division value is 9, the photographing device 100A divides the photographing screen into nine areas. Thereafter, when multi-focus photographing, the photographing device 100A focuses the subject based on the divided areas.

Next, the photographing device 100A consecutively photographs the subject by selectively focusing the divided areas according to an order value among the random number information 120A (D2). For example, if it is assumed that there are three areas divided by the screen division value, and an order value is assigned as a vector value of [3, 2, 1] to the divided areas, at first, the subject is photographed by focusing on the third area, to which the order value '1' is assigned, among the divided areas, and then the same subject is repeatedly photographed by focusing on the second area, to which the order value '2' is assigned, among the divided areas, and finally the same subject is repeatedly photographed by focusing on the first area, to which the order value '3' is assigned, among the divided areas. In this way, the same subject is repeatedly and consecutively photographed according to the order value.

In addition, the photographing device 100A stores a plurality of images generated through such multi-focus photographing as the multi-focus image 130A. In the above example, since three consecutive photographing would have occurred by changing the focus point according to the order value [3, 2, 1], the multi-focus image 130A will be composed of a total of three images.

Meanwhile, although it has been exemplified that multi-focus photographing is performed once for each divided area, the scope of the present invention is not limited thereto. For example, if it is assumed that there are 9 areas divided by the screen division value, and an order value is assigned as a vector value of [3, 0, 0, 2, 0, 0, 1, 0, 0] to the divided areas, only three consecutive photographing will occur sequentially focusing on the 7th area, the 4th area, and the 1st area. Multi-focus photographing is not performed in the 2nd, 3rd, 5th, 6th, 8th, and 9th areas, to which the order value '0' is assigned. Accordingly, in this example, the photographing screen is divided into nine areas, but only three images will be generated as the multi-focus image 130A.

Thereafter, the photographing device 100A communicates with the determination device 200A and transmits the stored multi-focus image 130A to the determination device 200A. In this case, the photographing device 100A transmits the previously obtained time information and the MAC address 110A together to the determination device 200A to generate random number information in the determination device 200A.

As an embodiment, in this case, the photographing device 100A may pack each image according to the photographed order and transmit it to the determination device 200A so that the determination device 200A can check the photographed order of each image included in the multi-focus image.

Alternatively, as an embodiment, the photographing device 100A may transmit the multi-focus image along with information indicating the photographed order of each image to the determination device 200A so that the determination device 200A can check the photographed order of each image included in the multi-focus image.

The determination device 200A receives the transmitted multi-focus image 220A, and checks the time information and the MAC address 110A transmitted together with the multi-focus image 220A. Then, based on the checked time information and the MAC address 110A, random number information 210A for determining the multi-focus image 220A is generated. In this case, the determination device 200A may generate the random number information 210A by inputting the checked time information and the MAC address 110A as input factors into the same random number generation algorithm previously used by the photographing device 100A. Since the same input factor is input into the same random number generation algorithm, the random number information 210A, which is the result, will also be output as the same value as the random number information 120A of the photographing device 100A.

Then, the determination device 200A determines the type of the transmitted multi-focus image 220A by referring to the screen division value and the order value included in the random number information 210A.

Specifically, the determination device 200A refers to the screen division value of the random number information 210A and checks whether the focused area of the multi-focus image matches the screen division value. If the screen division value and the focused area of the multi-focus image do not match each other (for example, an area that is not divided according to the screen division value is in focus, or two or more of the areas divided according to the screen division value are in focus simultaneously), since multi-focus photographing has not been performed according to a predetermined method, the determination device 200A may determine the type of the multi-focus image 220A as a 2-dimensional subject image, or a forged or falsified image.

Also, the determination device 200A refers to the order value among the random number information 210A and checks whether the focused order of the multi-focus image matches the order value. If the order value and the focused order of the multi-focus image do not match each other (for example, in a case that the order value allows the third area among the divided areas to be focused first, but in the actual multi-focus image, the first area is focused first), since multi-focus photographing has not been performed according to a predetermined method, the determination device 200A may determine the type of the multi-focus image 220A as a 2-dimensional subject image, or a forged or falsified image.

On the other hand, if the focused area of the multi-focus image matches the screen division value and the order value of the random number information 210A, respectively, the determination device 200A may consider that the multi-focus photographing has been performed according to a predetermined method, and determine the type of the multi-focus image 220A as a 3-dimensional subject image or a real image.

Figure 10:
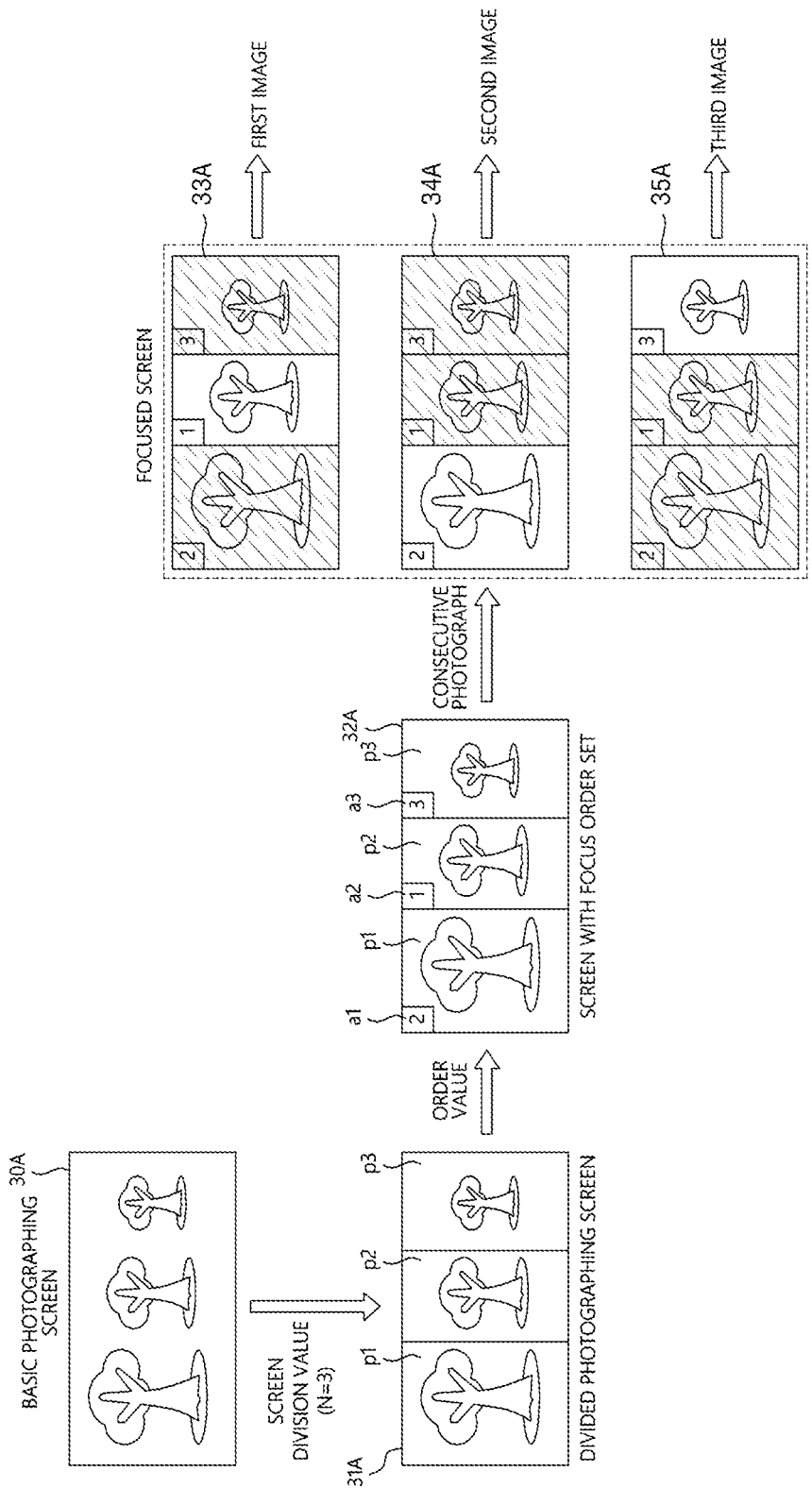
FIG. 10 is a diagram for describing in detail the multi-focus image mentioned in FIG. 9 and a photographing method thereof.

FIG. 10 is a diagram for describing in detail the multi-focus image mentioned in FIG. 9 and a photographing method thereof. In the embodiment of FIG. 10, multi-focus photographing when the screen division value is 3 and the order value is [2, 1, 3] will be exemplarily described.

Referring to FIG. 10, first, a basic photographing screen 30A is shown. This is, for example, a display screen of the photographing device 100A, indicating an initial photographing screen before starting multi-focus photographing. Three trees are displayed as subjects on the basic photographing screen 30A.

Thereafter, the photographing device 100A obtains random number information and extracts a screen division value therefrom. The screen division value at this time is exemplified as 3 (N=3). In addition, the photographing device 100A divides the basic photographing screen 30A into a plurality of areas according to the screen division value. In the middle portion of FIG. 10, a photographing screen 31A, in which the entire screen is divided into a plurality of areas p1, p2, and p3, is shown.

Then, the photographing device 100A sets a focus order for each of the divided areas p1, p2, and p3 according to the order value of the random number information. In the central portion of FIG. 10, a screen 32A, in which a focus order a1, a2, a3 is set for each of the divided areas p1, p2, and p3, is shown. In the embodiment of FIG. 10, a case that the focus order is set to '2' for the first area p1, '1' for the second area p2, and '3' for the third area p3 among the divided areas is exemplified.

Then, the photographing device 100A performs consecutive photographing according to the set focus order a1, a2, a3 for each of the divided areas p1, p2, and p3. Specifically, the photographing device 110A first focuses on the second area p2 having the focus order of '1' to photograph three trees, which are subjects. In FIG. 10, the non-focused area is indicated by hatching to distinguish it from the focused area. As a result of performing the first multi-focus photographing in this way, the first image 33A is generated. Then, the photographing device 110A focuses on the first area p1 having the focus order of '2' to repeatedly photograph three trees, which are the same subject. As a result of the second multi-focus photographing, the second image 34A is generated, as before. And finally, the photographing device 110A focuses on the third area p3 having the focus order of '3' to repeatedly photograph three trees, which are the same subject. Similarly, as a result of the third multi-focus photographing, the third image 35A is generated.

When all multi-focus photographing according to the order value is completed, the photographing device 100A packs and stores the generated images (first to third images) as a multi-focus image.

Figure 11:
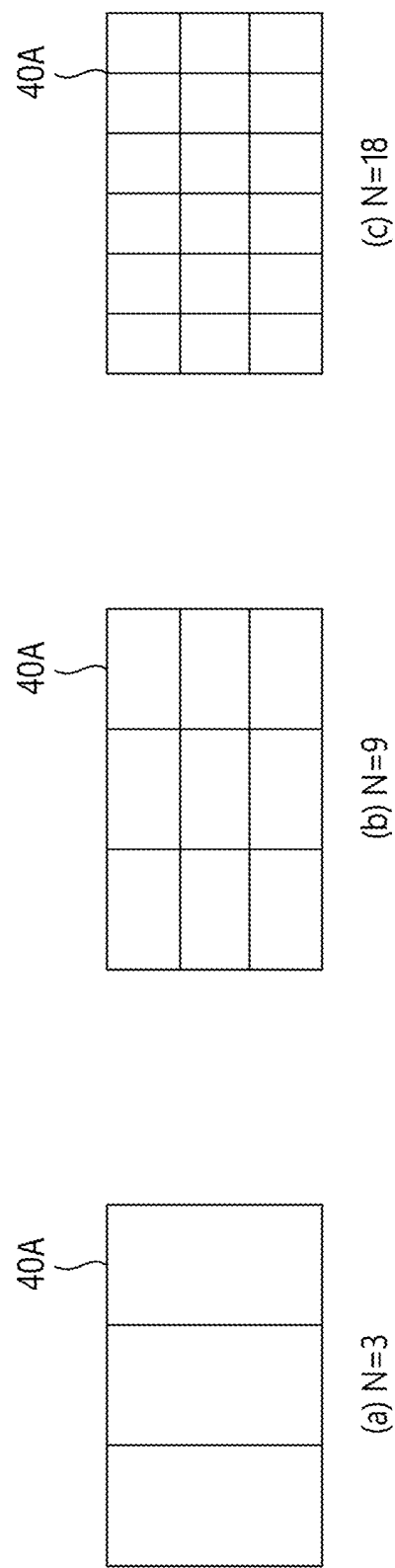
FIG. 11 is a diagram for describing examples of screen division according to various screen division values by way of specific examples.

FIG. 11 is a view for describing examples of screen division according to various screen division values by giving specific examples. Hereinafter, it will be described with reference to the drawings.

(a) of FIG. 11 is a case where the screen division value is 3 (N=3) and the entire photographing screen is divided into three areas as in the embodiment of FIG. 3. Here, the case of vertically dividing the entire screen is illustrated, but the present invention is not limited thereto, and horizontal division is also possible.

(b) of FIG. 11 is a case where the screen division value is 9 (N=9), and the entire photographing screen is divided into nine areas. As the most basic method, the entire screen may be equally divided into nine areas as shown, but is not limited thereto. For example, it is also possible to divide some areas into relatively larger areas.

(c) of FIG. 11 is a case where the screen division value is 18 (N=18), and the entire photographing screen is divided into 18 areas. As in (b) of FIG. 11, an example of equal division is illustrated, but the present invention is not limited thereto, and it is also possible to divide some areas into a relatively larger area or a narrower area.

Meanwhile, FIG. 11 exemplarily describes various cases of screen division, and it is obvious to those skilled in the art that various screen division methods not described herein (e.g., when the screen division value is 3000, or when the screen division area is a triangle) can be applied in a modified form.

Figure 12:
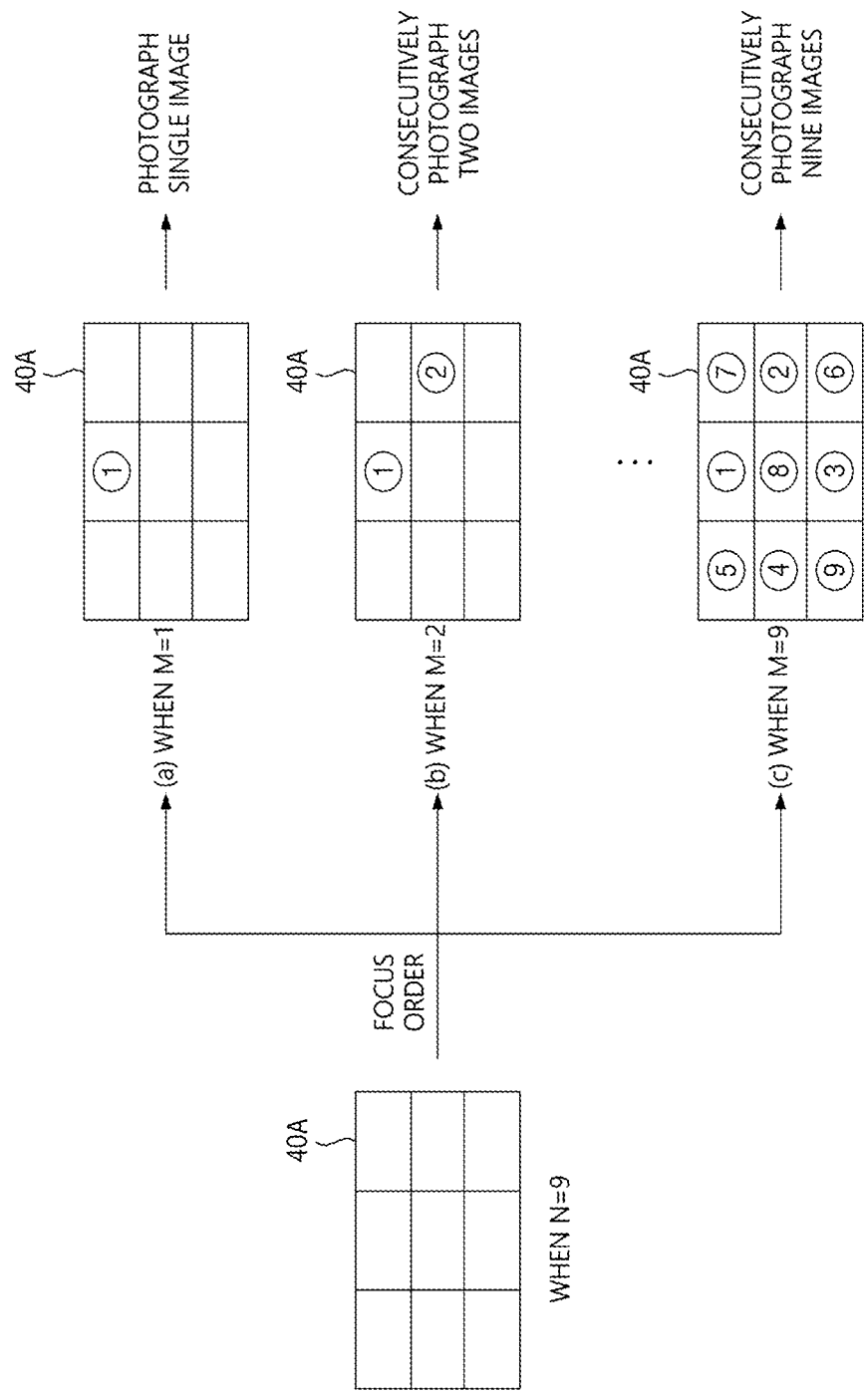
FIG. 12 is a diagram for describing examples of setting a photographing order according to various order values with specific examples.

FIG. 12 is a view for describing examples of setting a photographing order according to various order values with specific examples. The embodiment of FIG. 12 exemplifies a case where the screen division value is 9 (N=9) for specificity of description.

(a) of FIG. 12 illustrates a case where only one image is multi-focus photographed. Since it is to photograph a single image, it is somewhat far from the meaning of multi-focus, but for the sake of unity of terminology, the term multi-focus is also used in this case. Since it is a case of photographing one image, an order value of '1' is set for only one of the nine divided areas. Here, it is exemplified that the order value '1' is set for the second area. When multi-focus photographing is started, the photographing device 100A checks an area divided according to a screen division value, and focuses on a second area among them to photograph one image. As an example, in this case, the total order value extracted from the random number information 120A may be a vector value such as [0, 1, 0, 0, 0, 0, 0, 0, 0].

(b) of FIG. 12 shows a case where two images are multi-focus photographed. Since it is a case of photographing two images, order values of '1' and '2' are set for two of the nine divided areas. Here, it is exemplified that the order value '1' is set for the second area and the order value '2' is set for the sixth area. When multi-focus photographing is started, the photographing device 100A checks areas divided according to the screen division value, first focuses on the second area to photograph one image, and then focuses on the sixth area to photograph one image again. As an embodiment, in this case, the total order value extracted from the random number information 120A may be a vector value such as [0, 1, 0, 0, 0, 2, 0, 0, 0].

(c) of FIG. 12 shows a case where nine images are multi-focus photographed. Since it is a case of photographing 9 images, an order value of '1' to '9' is set for each of the 9 divided areas. When multi-focus photographing is started, the photographing device 100A checks the areas divided according to the screen division value, and sequentially focuses on the nine areas according to the order values, as shown in (c) of FIG. 12, to consecutively photograph nine images. As an embodiment, in this case, the total order value extracted from the random number information 120A may be a vector value such as [5, 1, 7, 4, 8, 2, 9, 3, 6].

In this way, if the photographing screen is divided into a plurality of areas and a multi-focus photographing order is designated for them, security from external hacking or malicious forgery or falsification can be greatly improved.

For example, when the screen division value is 9 and three images are multi-focus photographed, the number of multi-focus images that can be made therefrom becomes 3rd power of 9. Therefore, even if a multi-focus image is maliciously manipulated and submitted from the outside, the probability of matching the correct screen division value and order value (that is, the probability of determining it as a real image) is as low as 0.13%, forged and falsified images can be filtered out with a very high probability. Such security increases as the screen division value and the number of images to be photographed increase. For example, if the screen division value is 18 and the number of images to be multi-focus photographed is 5, the probability of erroneously determining the manipulated image as a real image is extremely low to 1/1,889,569 which is obtained by dividing 1 by the 5th power of 18.

Figure 13:
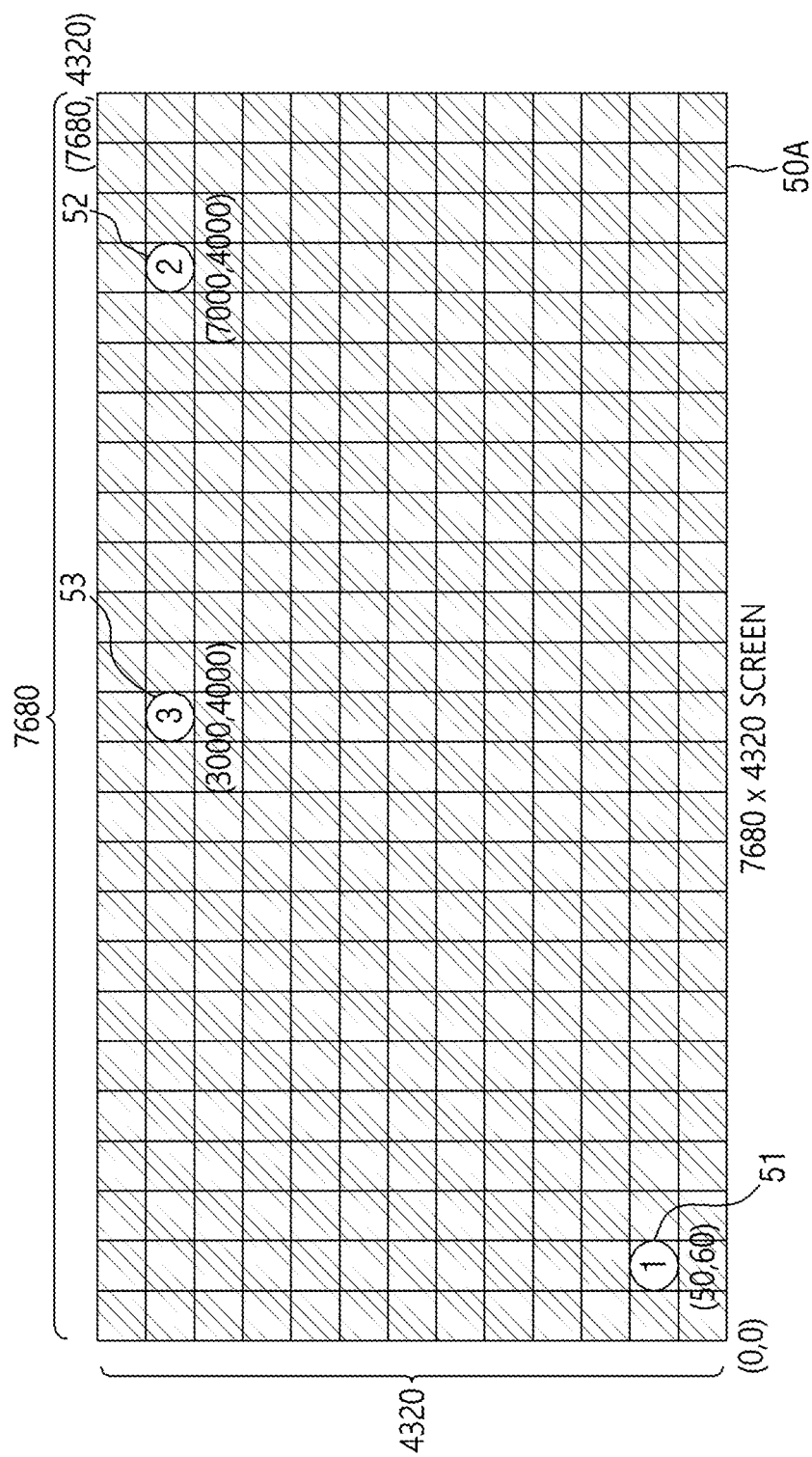
FIG. 13 is a diagram for describing an embodiment, in which the image photographing method according to the present invention is applied in units of pixels.

FIG. 13 is a view for describing an embodiment, in which the image photographing method according to the present invention is applied in units of pixels.

While the previous embodiments perform multi-focus photographing on areas separately divided according to screen division values, the embodiment of FIG. 13 performs multi-focus photographing on pixels of a photographing screen. Therefore, in the embodiment of FIG. 13, since the subject can be focused on the basis of each pixel already determined in hardware, a screen division value for screen division may not be separately required (since it can be seen that the photographing screen is already divided for each pixel).

In FIG. 13, the photographing device 100A extracts an order value from the random number information 120A, and sequentially focuses on each pixel according to the extracted order value to perform multi-focus photographing of multiple images for the same subject.

For example, as in the illustrated example, it is assumed that the number of pixels of the photographing screen is 7680×4320, and the extracted order values are [0, 0, . . . , 3, . . . , 0, 0, . . . , 2, . . . , 0, 0, . . . , 1, . . . , 0, 0]. At this time, the order value '3' is matched to the pixel at the coordinates (3000, 4000), the order value '2' is matched to the pixel at the coordinates (7000, 4000), and the order value '1' is matched to the pixel at the coordinates (50, 60), respectively.

The photographing device 100A focuses on the pixel at the coordinates (50, 60), in which the order value '1' is set, with reference to the extracted order value to photograph the first image, and then, focuses on the pixel at the coordinates (7000, 4000), in which the order value '2' is set, to photograph the second image, and lastly, focuses on the pixel at the coordinates (3000, 4000), in which the order value '3' is set', to photograph the third image. The photographed images (first to third images) are packed as a multi-focus image and transmitted to the determination device 200A.

The determination device 200A generates the random number information 210A in the same manner as in the previous embodiments, and extracts an order value therefrom. Then, the determination device 200A verifies the multi-focus image on whether each pixel is sequentially focused and photographed according to the extracted order value, and determines whether the multi-focus image is a 3-dimensional subject image (real image) or a 2-dimensional subject image (forged, falsified, or processed image) according to the result thereof.

Figure 14:
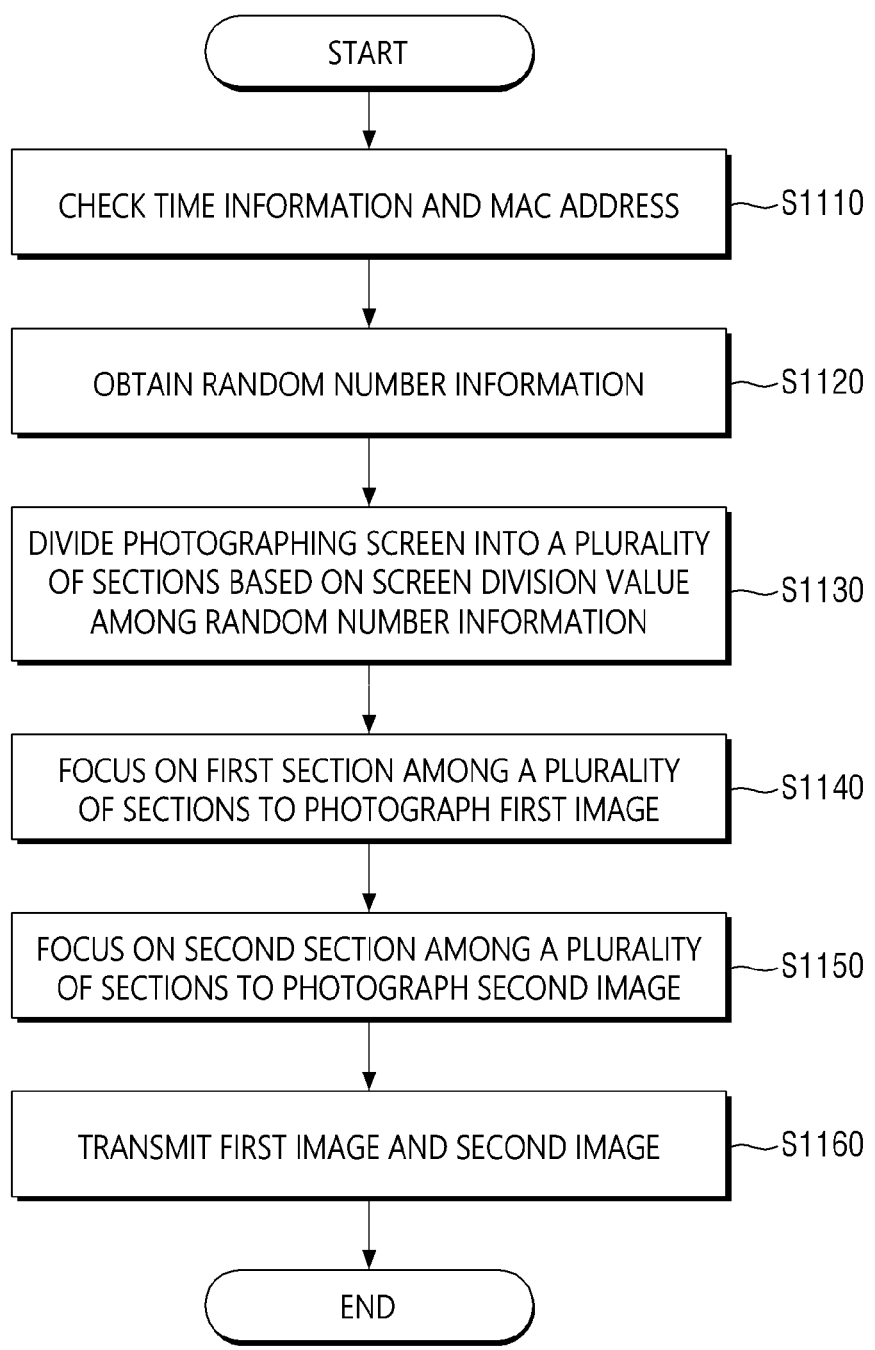
FIG. 14 is a flowchart illustrating an image photographing method according to an embodiment of the present invention.
Figure 15:
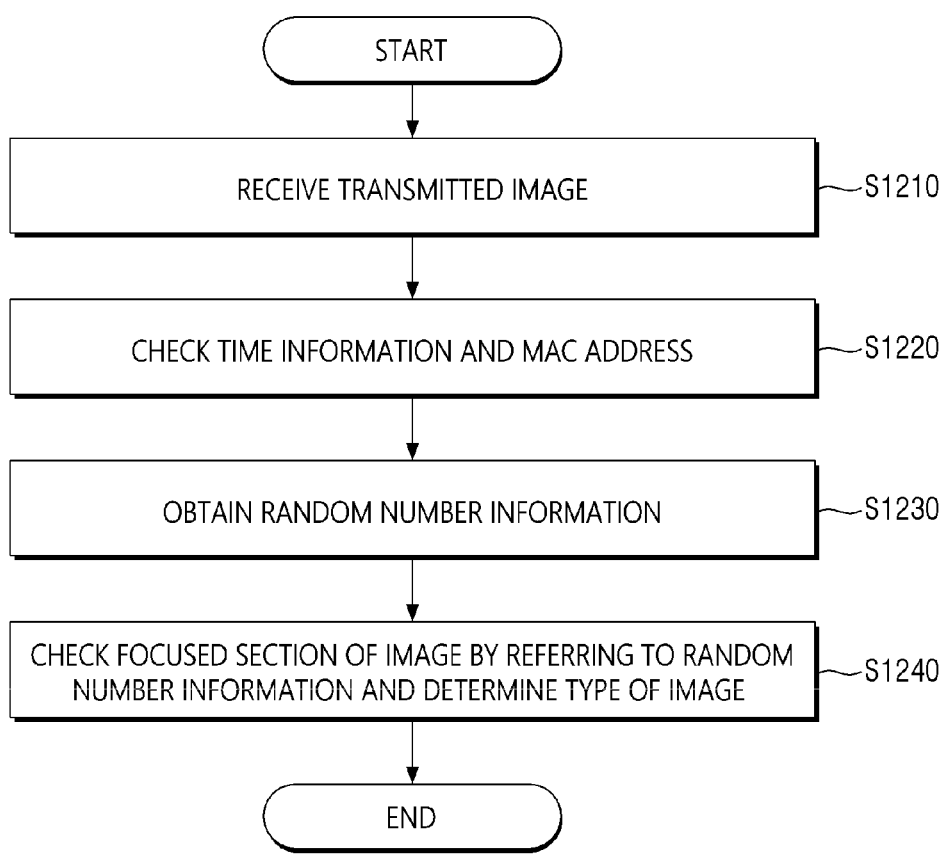
FIG. 15 is a flowchart illustrating an image determination method according to an embodiment of the present invention.
Figure 16:
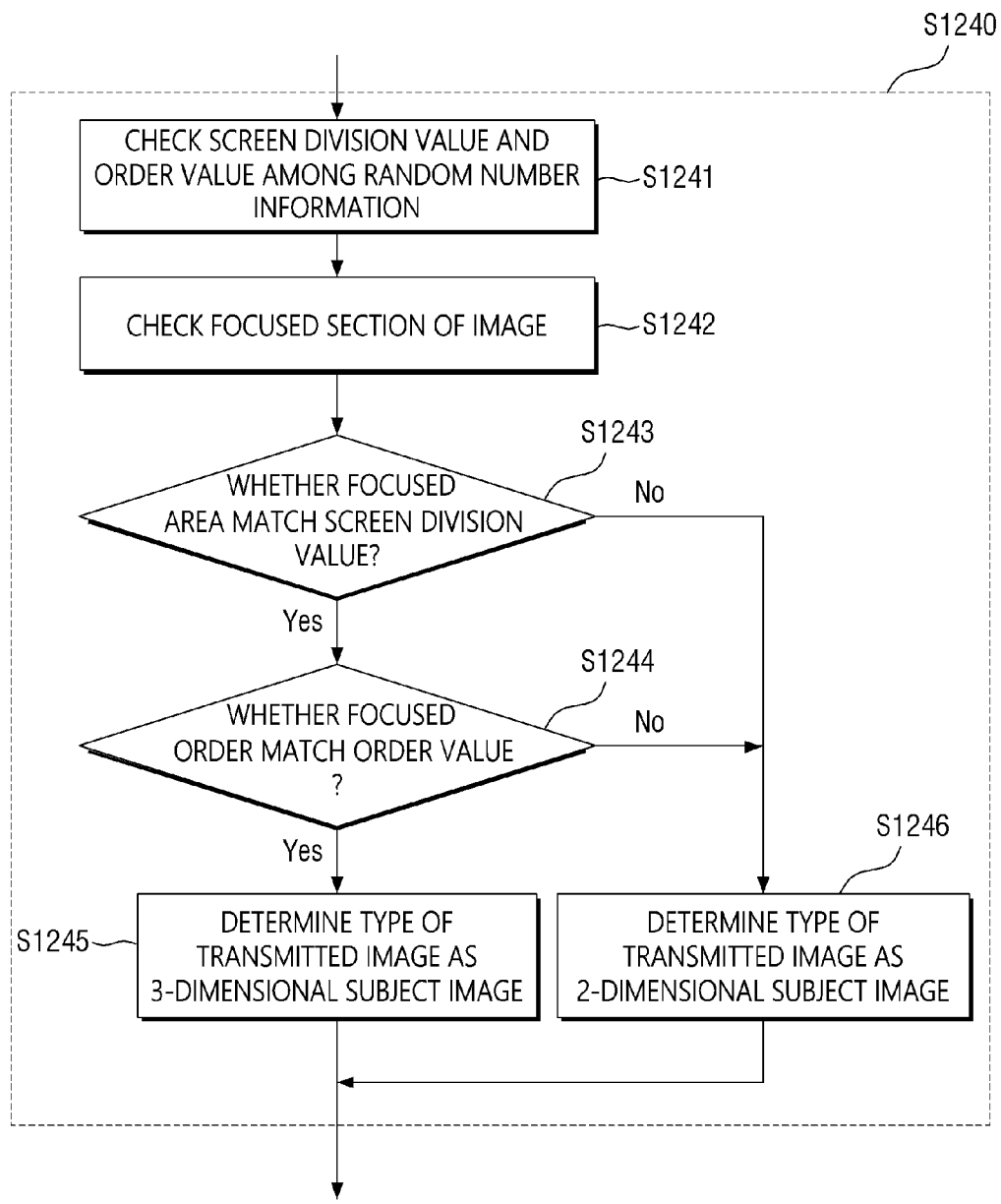
FIG. 16 is a flowchart illustrating an embodiment, in which the step of determining the type of the image of FIG. 15 is further detailed.

FIGS. 14 to 16 show flowcharts of various embodiments according to the present invention. In order to avoid the complexity of the description, in the following description, 'each area divided according to the screen division value' will be briefly referred to as a 'section.' In addition, in order to avoid duplication of description, repeated description of the same content as described above will be omitted as much as possible.

FIG. 14 is a flowchart illustrating an image photographing method according to an embodiment of the present invention. The embodiment of FIG. 14 shows a method of photographing a multi-focus image performed by the photographing device 100A illustrated in FIG. 8. Accordingly, in the case where the performing subject of each step is omitted in the embodiment of FIG. 14, it is assumed that the performing subject is the photographing device 100A.

In step S1110, the photographing device 100A checks time information and a MAC address. In this case, the time information may be time information of a clock built in the photographing device 100A or time information obtained through a network connected to the photographing device 100A. The MAC address may be a MAC address of the photographing device 100A.

In step S1120, the photographing device 100A obtains random number information based on the checked time information and the MAC address. As an embodiment, the photographing device 100A may obtain the random number information by inputting the time information and the MAC address as input information into a predetermined random number generation algorithm.

In this case, the obtained random number information may include a screen division value and an order value for multi-focus photographing.

In step S1130, the photographing device 100A divides the photographing screen illuminating the subject into a plurality of sections based on the screen division value among the random number information.

Thereafter, the photographing device 100A sets the focus order of the plurality of sections previously divided based on the order value among the random number information, and focuses on each section according to the set focus order to perform consecutive photographing.

In step S1140, the photographing device 100A focuses on a first section having a faster focus order among the plurality of sections to photograph the first image.

In step S1150, the photographing device 100A focuses on a second section having a later focus order among the plurality of sections to photograph the second image.

In step S1160, the photographing device 100A packs the photographed first image and the photographed second image as a multi-focus image and stores it. In this case, time information and MAC address referenced for obtaining random number information may be packed together. Then, when the photographing device 100A is connected to the determination device 200A through a network, the photographing device 100A transmits the previously stored multi-focus image to the determination device 200A.

Thereafter, the determination device 200A verifies whether each section is focused according to the screen division value and the order value with respect to the transmitted multi-focus image, and determines the type thereof.

Meanwhile, in the embodiment of FIG. 14, a case of multi-focus photographing of a plurality of sections has been described, but the scope of the present invention is not limited thereto. For example, it is also possible to generate only one image (first image) as a multi-focus image by focusing on only one section (first section) among the plurality of sections. In this case, the determination device 200A determines the type of a multi-focus image by only checking whether the focused section of the first image is a photographing section designated in the order value.

FIG. 15 is a flowchart illustrating an image determination method according to an embodiment of the present invention. The embodiment of FIG. 15 shows a method of determining a multi-focus image performed by the determination deice 200A shown in FIG. 8. Accordingly, in a case where the performing subject of each step is omitted in the embodiment of FIG. 15, it is assumed that the performing subject is the determination device 200A.

In step S1210, the determination device 200A receives the multi-focus image transmitted by the photographing device 100A.

In step S1220, the determination device 200A checks the time information and the MAC address transmitted together from the photographing device 100A.

In step S1230, the determination device 200A obtains random number information based on the previously checked time information and the MAC address. As an embodiment, the determination device 200A may obtain random number information by inputting the checked time information and the MAC address as input information into the same random number generation algorithm as that of the photographing device 100A. The obtained random number information may include a screen division value and an order value used for multi-focus photographing.

In step S1240, the determination device 200A refers to the screen division value and the order value of the random number information, and verifies whether the focused sections of the multi-focus image match the screen division value and the order value, and according to the verification result, determines the type of the multi-focus image as a 3-dimensional subject image (real image) or a 2-dimensional subject image (forged, falsified, or processed image).

This will be described in more detail with reference to FIG. 16. FIG. 16 is a flowchart illustrating an embodiment, in which the step (S1240) of determining the type of the image in FIG. 15 is further detailed. Hereinafter, it will be described with reference to the drawings.

In step S1241, the determination device 200A checks a screen division value and an order value among the random number information.

In step S1242, the determination device 200A checks a focused section of each image included in the multi-focus image. For example, when the first to third images are included in the multi-focuser image, the determination device 200A checks the focused section of the first image, the focused section of the second image, and the focused section of the third image, respectively.

In step S1243, the determination device 200A checks whether the focused area of each image matches the screen division value. If the focused area of each image does not match the screen division value (for example, when two or more of the sections according to the screen division value are simultaneously focused within one image, etc.), the present embodiment proceeds to step S1246. Conversely, when the focused area of each image matches the screen division value (e.g., the focused area of each image fits in the section according to the screen division value), the present embodiment proceeds to step S1244.

In step S1244, the determination device 200A checks whether the focused order of each section matches the order value. If the focused order of each section does not match the order value (for example, a case that the order value of the first section is '3,' but in fact, the first section is focused first and photographed, etc.), the present embodiment proceeds to step S1246. Conversely, when the focused order of each section matches the order value (e.g., when sequentially focused and photographed according to the order value set for each section), the present embodiment proceeds to step S1245.

In step S1245, since it is confirmed that the transmitted multi-focus image has been multi-focus photographed according to the screen division value and the order value, the determination device 200A determines the type of the multi-focus image as a 3-dimensional subject image (or a real image).

On the other hand, in the case of proceeding from steps S1243 and S1244 to step S1246, the transmitted multi-focus image is not multi-focus photographed according to the screen division value and the order value, so in step S1246, the determination device 200A determines the type of the multi-focus image as a 2-dimensional subject image (or a forged, falsified, or processed image).

Hereinafter, an exemplary computing device 500, in which the methods described in various embodiments of the present invention are implemented, will be described with reference to FIG. 17. For example, the user terminal 100 or the original proving server 200 of FIG. 1, and the photographing device 100 or the determination device 200 of FIG. 8 may be implemented as the computing device 500 of FIG. 17.

Figure 17:
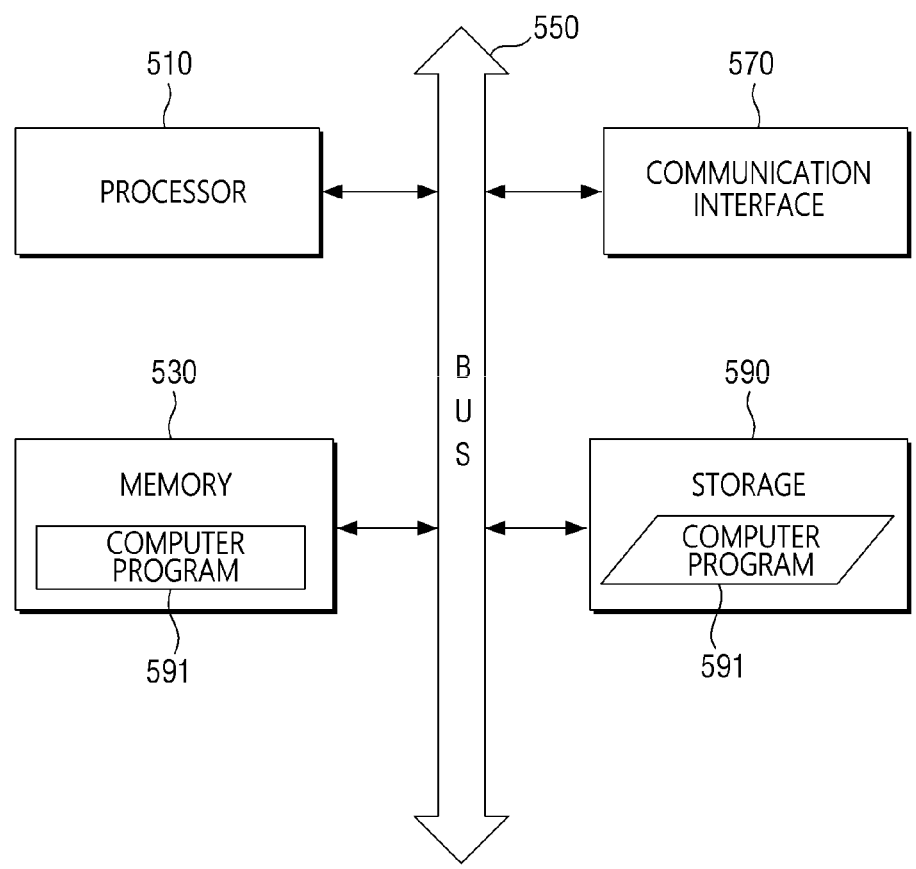
FIG. 17 is a block diagram illustrating an exemplary hardware configuration of a computing device 500, in which various embodiments of the present invention are implemented.

FIG. 17 is a hardware configuration diagram of an exemplary computing device 500.

Referring to FIG. 17, the computing device 500 may include one or more processors 510, a bus 550, a communication interface 570, a memory 530, which loads a computer program 591 executed by the processors 510, and a storage 590 for storing the computer program 591. However, FIG. 17 illustrates only the components related to the embodiment of the present disclosure. Therefore, it will be appreciated by those skilled in the art that the present disclosure may further include other general purpose components in addition to the components shown in FIG. 17.

The processor 510 controls overall operations of each component of computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented.

For example, the computer program 591 may include instructions for performing operations comprising an operation of obtaining proof data including a photographed image and a challenge code for proving original of the image, an operation of generating hash data by using the proof data, an operation of generating signature data for the hash data, an operation of transmitting the proof data, the hash data, and the signature data to a server, and an operation of receiving an access path to an original verification result of the proof data from the server.

Also, the computer program 591 may include instructions for performing operations comprising an operation of receiving proof data, hash data generated using the proof data, and signature data for the hash data from a user terminal, wherein the proof data includes a photographed image and a challenge code for proving original of the image, an operation of verifying the hash data, the signature data, and the challenge code, an operation of generating an original verification result of the proof data based on the verification result, and an operation of transmitting an access path to the original verification result to the user terminal.

When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method performed by a computing device for proving original, the method comprising:
   generating an image by a photographing method based on a real subject discrimination algorithm to generate the image;
   obtaining proof data comprising the photographed image and a challenge code for proving original of the image;
   generating hash data by using the proof data;
   generating signature data for the hash data;
   transmitting the proof data, the hash data, and the signature data to a server; and
   receiving an access path to an original verification result of the proof data from the server,
   wherein the generating of the image comprises:
   generating a random number information based on time information or an MAC address of a photographing device, the generated random number information including a screen division value for dividing a screen into a plurality of divided screen areas, and an order value designating a focus order of each divided screen area;
   photographing a subject by performing a multi-focus photographing, which selectively focuses a divided screen area according to the order value included in the random number information; and
   transmitting, to the server, a plurality of images generated through the multi-focus photographing as a multi-focus image, and the time information or the MAC address used for generating the random number information, and wherein the access path to the original verification result of the proof data is received from the server, based on a determination that the image included in the proof data is a real subject by using the multi-focus image, and the time information or the MAC address.

2. The method of claim 1, wherein the original verification result is generated according to a result of a verification, by the server, of the hash data, the signature data, and the challenge code.

3. The method of claim 1, wherein the transmitting comprises generating a transaction for recording the hash data in a blockchain network.

4. The method of claim 3, wherein the transmitting further comprises:
obtaining a transaction ID (identification) of the transaction; and
transmitting the transaction ID to the server.

5. The method of claim 3, wherein the server compares the transmitted hash data with hash data recorded in the blockchain network to verify the hash data.

6. The method of claim 1, further comprising:
providing the received access path to an external device.

7. The method of claim 6, wherein the external device includes at least one of an insurance company server, a trading brokerage site server, a law firm server, a media company server, and a public institution server, and the external device uses the access path to check the original verification result of the proof data.

8. A method performed by a computing device for proving original, the method comprising:
receiving proof data, hash data generated using the proof data, and signature data for the hash data from a user terminal, wherein the proof data includes an image which is photographed and a challenge code for proving original of the image;
verifying the hash data, the signature data, and the challenge code;
generating an original verification result of the proof data based on a result of the verification of the hash data, the signature data, and the challenge code; and
transmitting an access path to the original verification result to the user terminal,
wherein the image comprises a multi-focus image that includes a plurality of images generated through multi-focus photographing of a subject,
wherein the method further comprises receiving, from the user terminal, time information or a MAC address of a photographing device included in the user terminal, and
wherein the verifying comprises determining whether the image is an image of photographing a real subject by performing:
generating random number information by using the time information or the MAC address, the generated random number information including a screen division value for dividing a screen into a plurality of divided screen areas, and an order value designating a focus order of each divided screen area; and
determining that the image of the proof data is the image of photographing the real subject based on determining that a focused area and a focus order of a divided screen area of the multi-focus image matches with the screen division value and the order value of the random number information.

9. The method of claim 8, wherein the verifying further comprises:
verifying the hash data by comparing the hash data with hash data recorded in a blockchain network.

10. The method of claim 8, further comprising:
providing the original verification result of the proof data to an external device in response to a request of the external device through the access path,
wherein the external device includes at least one of an insurance company server, a trading brokerage site server, a law firm server, a media company server, and a public institution server.

11. A user terminal comprising:
one or more processors; and
a memory configured to store computer program executable by the one or more processors to perform:
generating an image by a photographing method based on a real subject discrimination algorithm to generate the image;
generating proof data including the photographed image and a challenge code for proving original of the image;
generating hash data by using the proof data;
generating signature data for the hash data;
transmitting the proof data, the hash data, and the signature data to a server; and
managing an access path to an original verification result of the proof data transmitted from the server,
wherein the generating of the image comprises:
generating a random number information based on time information or an MAC address of a photographing device, the generated random number information including a screen division value for dividing a screen into a plurality of divided screen areas, and an order value designating a focus order of each divided screen area;
photographing a subject by performing multi-focus photographing, which selectively focuses a divided screen area according to the order value included in the random number information; and
transmitting, to the server, a plurality of images generated through the multi-focus photographing as a multi-focus image, and the time information or the MAC address used for generating the random number information, and
wherein the access path to the original verification result of the proof data is received from the server, based on a determination that the image included in the proof data is a real subject by using the multi-focus image, and the time information or the MAC address.

* * * * *